United States Patent
Lang et al.

(10) Patent No.: US 10,961,264 B2
(45) Date of Patent: Mar. 30, 2021

(54) PROCESS FOR ISOLATING A (THIO)PHOSPHORIC ACID DERIVATIVE

(71) Applicant: BASF SE, Ludwigshafen am Rhein (DE)

(72) Inventors: Tobias Lang, Dossenheim (DE); Zoltan Baan, Maxdorf (DE); Philip Muelheims, Ludwigshafen (DE); Anton Flajs, Mutterstadt (DE); Hartmut Denecke, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/779,306

(22) PCT Filed: Dec. 1, 2016

(86) PCT No.: PCT/IB2016/057253
§ 371 (c)(1),
(2) Date: May 25, 2018

(87) PCT Pub. No.: WO2017/093925
PCT Pub. Date: Jun. 8, 2017

(65) Prior Publication Data
US 2018/0319826 A1 Nov. 8, 2018

(30) Foreign Application Priority Data
Dec. 1, 2015 (EP) .................................. 15197308

(51) Int. Cl.
C07F 9/22 (2006.01)

(52) U.S. Cl.
CPC .................................. *C07F 9/224* (2013.01)

(58) Field of Classification Search
None
See application file for complete search history.

(56) References Cited

U.S. PATENT DOCUMENTS

| | | | |
|---|---|---|---|
| 4,530,714 A | 7/1985 | Kolc et al. | |
| 5,770,771 A | 6/1998 | Sulzer et al. | |
| 5,955,630 A | 9/1999 | Cheng et al. | |
| 8,513,460 B2 | 8/2013 | Kysilka et al. | |
| 2008/0287709 A1 | 11/2008 | Huttenloch et al. | |
| 2011/0028761 A1* | 2/2011 | Bock | C05G 3/90 564/15 |
| 2011/0196172 A1* | 8/2011 | Kysilka | C07F 9/224 564/14 |
| 2012/0218575 A1 | 8/2012 | Paxton et al. | |
| 2017/0128927 A1 | 5/2017 | Garella et al. | |
| 2017/0369385 A1 | 12/2017 | Schmid et al. | |

FOREIGN PATENT DOCUMENTS

| | | | |
|---|---|---|---|
| CN | 1872800 | * | 12/2006 |
| CN | 101412733 | * | 4/2009 |
| CN | 101525348 A | | 9/2009 |
| CN | 102746333 A | | 10/2012 |
| CN | 103755739 A | | 4/2014 |
| CN | 105399767 | * | 3/2016 |
| CN | 105440073 | * | 3/2016 |
| EP | 0119487 A1 | | 9/1984 |
| EP | 2687536 A1 * | 1/2014 | ............ C07F 9/224 |
| EP | 2687536 A1 | | 1/2014 |
| WO | 2009121786 A1 | | 10/2009 |
| WO | 2017055610 A1 | | 4/2017 |

OTHER PUBLICATIONS https://www.trc-canada.com/product-detail/?CatNum=B694000, downloaded on Apr. 29, 2020 (Year: 2020).*
International Search Report and Written Opinion for International Application No. PCT/IB2016/057253, dated Mar. 10, 2017, 7 pages.
Kiss, S.; Simihaian, M: "Improving Efficiency of Urea Fertilizers by Inhibition of Soil Urease Activity", 2002, Kluwer Academic Publishers pp. 1-4, 142-155.
Goehring, M.; Niedenzu, K.; Chemische Berichte 89, Nr. 7, pp. 1768-1771 (1956).
European Search Report for EP Application No. 16870094.6, dated Jun. 14, 2019, 9 pages.

* cited by examiner

*Primary Examiner* — Amy C Bonaparte
(74) *Attorney, Agent, or Firm* — Armstrong Teasdale LLP

(57) ABSTRACT

Provided herein is a process for isolating at least one (thio)phosphoric acid derivative, which has a boiling point of at least 70° C., from a product mixture including the at least one (thio)phosphoric acid derivative, at least one salt selected from ammonium salts and alkali metal chlorides, at least one polar solvent selected from the group consisting of ester solvents and ether solvents, and optionally at least one HCl scavenger; wherein the process is based on first dissolving the (thio)phosphoric acid derivative to be able to remove the at least one salt, and then causing solids formation of the (thio)phosphoric acid derivative.

13 Claims, No Drawings

PROCESS FOR ISOLATING A (THIO)PHOSPHORIC ACID DERIVATIVE

CROSS-REFERENCE TO RELATED APPLICATIONS

This application is the national stage entry of PCT/IB2016/057253, filed on Dec. 1, 2016, which claims the benefit of priority to European Patent Application No. 15197308.8, filed Dec. 1, 2015, which is incorporated by reference in its entirety herein.

BRIEF DESCRIPTION

The present invention relates to a process for isolating at last one (thio)phosphoric acid derivative (1a), which has a boiling point of at least 70° C., from a product mixture (1) comprising as component (1a) the at least one (thio)phosphoric acid derivative, as component (1b) at least one salt selected from (b1) ammonium salts and (b2) alkali metal chlorides, as component (1c) at least one polar solvent, which is selected from the group consisting of ester solvents and ether solvents, and optionally as component (1d) at least one HCl scavenger; wherein the process comprises at least the steps of (a) heating the product mixture (1) to a temperature, which is sufficient for at least partly dissolving the at least one (thio)phosphoric acid derivative (1a), (b) separating the solid material from the heated product mixture (1) to remove the at least one salt (1b) and to obtain a solution comprising the at least one (thio)phosphoric acid derivative (1a), the at least one polar solvent (1c), and optionally the at least one HCl scavenger (1d), (c) causing solids formation of the at least one (thio)phosphoric acid derivative (1a) from the obtained solution, and (d) isolating the solid material.

BACKGROUND

Worldwide there is an increasing need for urease inhibitors and convenient and cost-effective large-scale processes for preparing them.

Urease inhibitors are used in combination with urea-based fertilizers to inhibit the hydrolysis of urea by the enzyme urease, which is present ubiquitously in the soil, thereby preventing a loss of nitrogen from the fertilizer due to the formation of gaseous ammonia (for a general review see Kiss, S.; Simihäian, M. (2002) Improving Efficiency of Urea Fertilizers by Inhibition of Soil Urease activity, ISBN 1-4020-0493-1, Kluwer Academic Publishers, Dordrecht, The Netherlands).

(Thio)phosphoric acid derivatives such as (thio)phosphoric acid triamides and (thio)phosphoric acid ester amides are known to be effective urease inhibitors for use in combination with urea-based fertilizers. N-hydrocarbylthiophosphoric acid triamides and N-hydrocarbylphosphoric acid triamides for use as urease inhibitors are, e.g., described in U.S. Pat. No. 4,530,714. Among the most potent known urease inhibitors are N-alkylthiophosphoric acid triamides and N-alkylphosphoric acid triamides, which are described in EP 0 119 487, for example. Additionally, mixtures of N-(n-butyl)thiophosphoric acid triamide (NBPT) and N-(n-propyl)thiophosphoric acid triamide (NPPT) can advantageously be used. Such mixtures are described in US 2012/218575 A1.

Known processes for preparing N-hydrocarbyl(thio)phosphoric acid triamides involve a two-step procedure, in which an N-hydrocarbylamino(thio)phosphoryl dichloride (e.g. $R^1R^2NP(=O)Cl_2$ or $R^1R^2NP(=S)Cl_2$) is formed in a first reaction by reacting (thio)phosphoryl trichloride with an amine, and in which, in a second reaction, the N-hydrocarbylamino(thio)phosphoryl dichloride is reacted with ammonia to produce a slurry, from which the co-product ammonium chloride is removed by aqueous extraction after removing the ammonia under reduced pressure, or by filtration after removing the ammonia under reduced pressure and dissolving the product (e.g. $R^1R^2NP(=O)(NH_3)_2$ or $R^1R^2NP(=S)(NH_3)_2$) through increasing the temperature, or by separating a phase rich in ammonia and ammonium chloride from the organic product phase under pressure being high enough to keep the ammonia liquid. The reactions of the procedure may be summarized as follows.

Preparation of N-Hydrocarbylphosphoric Acid Triamides

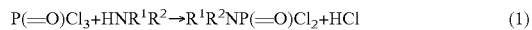                                                 (1)

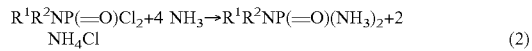                                                 (2)

Preparation of N-Hydrocarbylthiophosphoric Acid Triamides

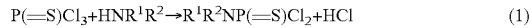                                                 (1)

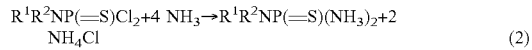                                                 (2)

$R^1$ and $R^2$ are defined below. A skilled person will understand that in the second reaction, also amines different from ammonia can be used. However, amide formation with ammonia is preferred for most (thio)phosphoric acid triamides, which are used as urease inhibitors.

Known processes for preparing O-hydrocarbyl(thio)phosphoric acid ester diamides involve a two-step procedure, in which an O-hydrocarbyloxy(thio)phosphoryl dichloride (e.g. $R^7OP(=O)Cl_2$ or $R^7OP(=S)Cl_2$) is formed in a first reaction by reacting (thio)phosphoryl trichloride with an alcohol, and in which, in a second reaction, the O-hydrocarbyloxy(thio)phosphoryl dichloride is reacted with ammonia to produce a slurry, from which the co-product ammonium chloride is removed by aqueous extraction after removing the ammonia under reduced pressure, or by filtration after removing the ammonia under reduced pressure and dissolving the product (e.g. $R^1R^2NP(=O)(NH_3)_2$ or $R^1R^2NP(=S)(NH_3)_2$) through increasing the temperature, or by separating a phase rich in ammonia and ammonium chloride from the organic product phase under pressure being high enough to keep the ammonia liquid. The reactions of the procedure may be summarized as follows.

Preparation of O-Hydrocarbylphosphoric Acid Ester Diamides

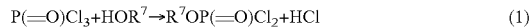                                                 (1)

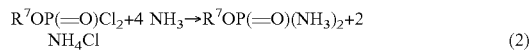                                                 (2)

Preparation of O-Hydrocarbylthiophosphoric Acid Ester Diamides

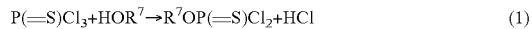                                                 (1)

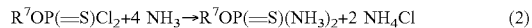                                                 (2)

R[7] is defined below. A skilled person will understand that in the second reaction, also amines different from ammonia can be used. However, amide formation with ammonia is preferred for most (thio)phosphoric acid ester amides, which are used as urease inhibitors. It is to be understood that instead of ammonia also an alkali metal amide, e.g. $NaNH_2$, may be used in the second reaction. A skilled person will also understand that the above procedure may be modified as such that (thio)phosphoric acid diester amides (e.g. $(R^7O)_2P(=O)NH_3$ or $(R^7O)_2P(=S)NH_3$) can be prepared.

The preparation of N-hydrocarbyl(thio)phosphoric acid triamides and O-hydrocarbyl(thio)phosphoric acid ester amides, respectively, involving the above described first and second reactions are, e.g., described in Goehring, M.; Niedenzu, K.; Chemische Berichte 89, Nr. 7, pp. 1768-1771 (1956), and in U.S. Pat. No. 4,530,714 A.

The first reaction typically requires the presence of an organic solvent and optionally an HCl scavenger, which is preferably a tertiary amine. Both, the organic solvent and the optionally present HCl scavenger typically have to be removed later on. However, a work-up is preferably not performed after the first reaction, but only after the second reaction, in order to safe costs and time.

Also for the second reaction, an organic solvent is required, which may be the same as in the first reaction. The addition of further amounts of an HCl scavenger is typically not required, as ammonia (or another amine selected as a reactant for the second reaction) may function not only as the reactant, but also as HCl scavenger, if applied in sufficient amounts. In particular, the ammonia may also set free the HCl scavenger used in the first reaction, so that a product mixture may be obtained, which comprises the desired (thio)phosphoric acid derivative, ammonium chloride (or a chloride salt resulting from the use of a different amine or an alkali metal chloride resulting from the use of an alkali metal amide), the organic solvent, and the optionally present HCl scavenger, typically in the form of the free base.

However, it is difficult to isolate the desired product, i.e. the (thio)phosphoric acid derivative, from this product mixture, in particular if a high purity of the product is required.

Several work-up procedures have been suggested in this connection in the prior art, which are summarized in the following. However, these work-up procedures have disadvantages, in particular with regard to the purity of the obtained product or the requirement of more than one purification step.

According to EP 2 204 372 B1, ammonium chloride may be dissolved in water and separated from the product mixture, while the organic solvent may be removed from the resulting mixture by means of distillation. It is further disclosed that the desired product N-(n-butyl)thiophosphoric acid triamide (NBPT) may be separated in molten form from the HCl scavenger, as two phases are obtained after removal of the solvent, if certain HCl scavengers are used. However, the resulting product contains only 76 wt.-% of NBPT, so that a further purification step may become necessary.

U.S. Pat. No. 5,770,771 A1 discloses a process, wherein an inorganic phase containing ammonia and ammonium chloride is separated from an organic phase containing the product, an organic solvent, residual ammonia and an HCl scavenger. Ammonia and parts of the organic solvent are then removed by a first distillation step. Further purification can then be achieved by using a wiped film evaporator. In this connection, it is described in U.S. Pat. No. 5,955,630 that N-hydrocarbyl(thio)phosphoric acid triamides, such as N-(n-butyl)thiophosphoric acid triamide (NBPT), can be isolated from mixtures with organic solvents and tertiary amines by using a wiped film evaporator, which operates at a temperature in the range of about 60 to 140° C. However, purification by using a wiped film evaporator has the disadvantage that the product may partly decompose. In particular, this may occur in the case of (thio)phosphoric acid derivatives with rather high melting points of at least 70° C., preferably at least 80° C., more preferably at least 85° C., such as N-(n-propyl)thiophosphoric acid triamide (NPPT), as higher temperatures are then required for the wiped film evaporation to ensure that the (thio)phosphoric acid derivatives are present in the form of a melt because otherwise solids formation on the heating surface of the wiped film evaporator occurs.

Thus, although it seems to be the general approach to remove inorganic salts from the product mixture by phase separation in a first step, and to evaporate the solvent and the optionally present HCl scavenger in a second step, such work-up procedures have the disadvantage that the purity of the obtained product is rather low, especially due to phosphorus containing byproducts which remain in the bottom product together with the desired product after evaporation. Accordingly, further purification steps may become necessary, although the work-up procedure already comprises two steps.

Furthermore, problems arise in connection with the phase separation step in view of the fact that phase separation requires either working under pressure to keep the ammonia liquid to dissolve and remove the salts of the product mixture, or adding water to dissolve and remove the salts of the product mixture.

With regard to the solvent evaporation, the problem arises that this step is not suitable for separating the desired product from any phosphorus containing byproducts. The formation of byproducts therefore has to be avoided and/or additional purification steps become necessary.

With regard to the additional purification steps, it is disadvantageous that they either require the use of an additional solvent for recrystallization or bear the risk of decomposition of the product.

Accordingly, there is a need for improved work-up procedures in connection with the preparation of (thio)phosphoric acid derivatives, in particular with a view to (thio) phosphoric acid derivatives having a melting point of at least 70° C., which may easily decompose when being purified by wiped film evaporation as outlined above. In this connection, it is also desired to avoid a phase separation step and to avoid numerous purification steps.

An alternative work-up procedure based on precipitation of the desired product is described in U.S. Pat. No. 8,513, 460 B1, which discloses a process of recovering an N-hydrocarbyl(thio)phosphoric acid triamide from a product mixture comprising the N-hydrocarbyl(thio)phosphoric acid triamide, ammonium chloride and an aromatic solvent by a process comprising heating the product mixture to a temperature, which ensures dissolution of the product in the aromatic solvent, so that the solid ammonium chloride can be removed by filtration, and cooling the resulting mother liquor, so that the product solidifies and can be filtered off.

However, the work-up procedure does not address the problem of a HCl scavenger being present in the product mixture in addition to ammonia and ammonium chloride, respectively, as the HCl scavenger, which is present in the first reaction of the process of preparing the N-hydrocarbyl (thio)phosphoric acid triamide is removed prior to the second reaction with ammonia, which acts as nucleophile and HCl scavenger at the same time.

Furthermore, the work-up procedure according to U.S. Pat. No. 8,513,460 B1 is disadvantageous as aromatic solvents such as toluene are difficult to remove, when drying the crystals. This is particularly problematic in view of the fact that most N-hydrocarbyl(thio)phosphoric acid triamides decompose at increased temperatures.

Moreover, it has been found by the inventors of the present invention that the work-up procedure according to U.S. Pat. No. 8,513,460 B1 does not work for N-hydrocarbyl (thio)phosphoric acid triamides in general. In particular, it has been found that N-(n-propyl)thiophosphoric acid triamide (NPPT) is not sufficiently soluble in toluene to perform the work-up procedure according to U.S. Pat. No. 8,513,460 B1. Upon heating the product mixture, it is thus not possible to dissolve NPPT to a large extent, and as a consequence, also the product is filtered off, when filtering off the ammonium chloride, resulting in significant yield losses.

According to EP 2 687 536 A1, N-(n-butyl)thiophosphoric acid triamide (NBPT) may be isolated from a product mixture comprising NBPT, ethyl acetate, and ammonium chloride by filtering off the ammonium chloride, removing ethyl acetate from the obtained solution until a 50% solution of NBPT is obtained, and causing crystallization of NBPT by adding n-hexane.

However, the addition of n-hexane is disadvantageous as an additional solvent has to be used in the process. Furthermore, n-hexane is problematic in terms of environmental safety.

Moreover, EP 2 687 536 A1 does not describe the work-up of other N-hydrocarbyl(thio)phosphoric acid triamides apart from NBPT, which may be more difficult to purify in view of their solubility properties.

Further work-up procedures based on crystallization are described in CN 102746333 A and CN 103755739 A, wherein dichloromethane is used as solvent. However, also these work-up procedures are exclusively described for NBPT as N-hydrocarbyl(thio)phosphoric acid triamide, but not for other N-hydrocarbyl(thio)phosphoric acid triamides, which may be more difficult to purify in view of their solubility properties.

CN 101525348 A discloses a work-up procedure including the addition of water, phase separation, distillation, and then crystallization from a mixture of water and methanol. The use of water and methanol is disadvantageous for an industrial process, as the solvents are difficult to remove, and methanol is toxic.

In general, it is assumed that the solubility properties of a (thio)phosphoric acid derivative at least to some extent depend on the melting point. For example, dissolution of low melting (thio)phosphoric acid derivatives such as NBPT may be enhanced upon heating as they start melting. On the other hand, when the melting point of higher melting (thio) phosphoric acid derivatives such as NPPT is reached, this may result in decomposition, so that it is not possible to take advantage of this effect. Therefore, purification of high melting (thio)phosphoric acid derivatives is not only difficult in connection with wiped film evaporation, but also in connection with crystallization processes.

SUMMARY

In view of the above, it was an object of the present invention to provide a process for isolating (thio)phosphoric acid derivatives, which have a high melting point of at least 70° C., from product mixtures comprising the (thio)phosphoric acid derivative, a chloride salt of the ammonia (or the different amine) as used in the second reaction of the preparation of the (thio)phosphoric acid derivative, the process solvent, and optionally the HCl scavenger as used in the first reaction of the preparation of the (thio)phosphoric acid derivative.

In this connection, it was another object of the present invention to provide a process for isolating (thio)phosphoric acid derivatives, which avoids a phase separation step, which requires either working under pressure to keep the ammonia liquid to dissolve and remove the salts of the product mixture, or adding water to dissolve and remove the salts of the product mixture.

Furthermore, it was an object of the present invention to provide a process for isolating (thio)phosphoric acid derivatives, which is suitable for selectively isolating the desired (thio)phosphoric acid derivatives, even if phosphorus containing byproducts are present in the product mixture in a significant amount of, e.g., at least 10 mol % based on the total amount of phosphorus containing compounds.

Furthermore, it was another object of the present invention to provide a process for isolating (thio)phosphoric acid derivatives, which avoids thermal decomposition of the product as often observed when isolation is performed by thin film evaporation.

Furthermore, it was another object of the present invention to provide a process for isolating (thio)phosphoric acid derivatives, which does not require numerous purification steps, but nevertheless provides the product in a purity of at least 90 wt.-%, preferably at least 97 wt.-% based on the total weight of the solid material.

Furthermore, it was another object of the present invention to provide a process for isolating (thio)phosphoric acid derivatives, which can also be performed with a product mixture comprising an HCl scavenger, especially a tertiary amine.

Furthermore, it was another object of the present invention to provide a process for isolating (thio)phosphoric acid derivatives, which does not require the addition of any additional chemicals apart from the chemicals as used in the process of preparing the (thio)phosphoric acid derivatives.

In particular, it was an object of the present invention to provide a process for isolating N-(n-propyl)thiophosphoric acid triamide (NPPT), which has significantly different solubility properties in comparison to N-(n-butyl)thiophosphoric acid triamide (NBPT), and is also difficult to purify in view of its rather high melting point of 91° C.

It has surprisingly been found by the inventors of the present invention that the above objects can be achieved, if the desired (thio)phosphoric acid derivative is isolated from a product mixture, which comprises apart from the (thio) phosphoric acid derivative, the salt to be removed, and the optionally present HCl scavenger, a polar solvent, which is selected from the group consisting of ester solvents and ether solvents, because it is then possible to perform a process of isolating the (thio)phosphoric acid derivative, which has the following advantages.

First, the process does not require a phase separation step, so that the use of water or a separation step under pressure can in any case be avoided. Instead, the process makes use of the following surprising finding. Although the (thio) phosphoric acid derivatives as defined herein, in particular N-(n-propyl)thiophosphoric acid triamide (NPPT), only have a poor solubility in polar solvents such as dichloromethane, and also only have a poor solubility in aromatic solvents such as toluene, even at higher temperatures in the range of from 30° C. to 80° C., it has surprisingly been found that ether solvents and ester solvents, in particular ethyl acetate, have outstanding dissolving properties in connection with (thio)phosphoric acid derivatives as defined herein, especially NPPT. In particular, it has been found that NPPT can be dissolved to a large extent in ethyl acetate upon moderate heating, while it again precipitates upon cooling to room temperature. Thus, by heating the product mixture, which is obtained after the preparation of the (thio)phosphoric acid derivative and which comprises an ether solvent or an ester solvent, to a moderate temperature of, e.g., from 30° C. to 80° C., the desired product can be dissolved to a large extent, so that the salt contained in the product mixture can easily be removed from the heated product mixture, e.g., by filtration. Then, the product can easily be isolated from the obtained solution by causing solids formation, e.g., by partly evaporating the solvent from the solution and/or cooling the solution. In connection with the solids formation of the desired product, it has surprisingly been found that solids formation can be achieved already at moderately decreased temperatures of, e.g., from −20° C. to 25° C.

Second, the process may also advantageously be used for the isolation of the desired product if phosphorus containing byproducts are present in the product mixture in a significant amount of, e.g., at least 10 mol % based on the total amount of phosphorus containing compounds. This is due to the fact that the isolation process involves solids formation of the desired product, rather than isolation of the product as a bottom product of an evaporation process as, e.g., in the case of wiped film evaporation, which is not suitable for separating the desired (thio)phosphoric acid derivative from phosphorus containing byproducts. As the isolation process of the present invention is suitable for separating the desired (thio)phosphoric acid derivative from phosphorus containing byproducts, also the preparation of the desired (thio)phosphoric acid derivative can be simplified. For example, the preparation can be performed with less equivalents of ammonia, without having the need of using special reactors as suggested by WO 2009/121786 A1 or working at particularly low temperatures as suggested by EP 2 687 536 A1.

Third, the process of the invention does not require high temperatures, so that thermal decomposition of the product can be avoided. In particular, it has surprisingly been found that the (thio)phosphoric acid derivatives can be dissolved in the specific solvents as used in the process already at moderate temperatures of, e.g., from 30° C. to 80° C., preferably from 40° C. to 60° C., so that the thermal stress for the product can be kept low. Furthermore, drying of the isolated (thio)phosphoric acid derivatives can be performed at moderate temperatures of, e.g., from 50° C. to 70° C. as the polar solvents as used in the process of the invention, in particular tetrahydrofuran, 2-methyltetrahydrofuran, and ethyl acetate, have rather low boiling points in comparison, e.g., to toluene.

Fourth, the process of the invention provides the desired product in a purity of at least 90 wt.-%, preferably at least 97 wt.-% based on the total weight of the solid material, already without a further recrystallization step. That means that, after a process involving only two steps of removing solid material (one for the removal of the salt and one for the isolation of the product), high purities of the product can be obtained. Of course, the purity may then further be increased by recrystallization.

Fifth, the process of the invention is advantageous in that it can also be performed if a HCl scavenger such as a tertiary amine is present in the product mixture. This is contrary to the teaching of U.S. Pat. No. 8,513,460 B1, wherein the isolation process is performed starting with a product mixture, which does not comprise a HCl scavenger, as the HCl scavenger is already removed before the second reaction of the reaction process is performed.

Sixth, the process of the present invention is economically advantageous because apart from the solvents, which are already present in the product mixture from the preparation reactions, no additional solvents are required to perform the isolation process. If it is intended to enhance solids formation of the (thio)phosphoric acid derivative, it is not necessary to add a further chemical, which has not been used in the preparation process. Instead, an additional amount of the HCl scavenger may be added to reduce solubility of the desired product.

Seventh, it has been found that the isolation process of the present invention is particularly advantageous for isolating N-(n-propyl)thiophosphoric acid triamide (NPPT). In general, the isolation of NPPT is always difficult because it has a rather high melting point of 91° C., which makes purification by wiped film evaporation difficult in view of the problem of decomposition of the product. Furthermore, NPPT has significantly different solubility properties in comparison to N-(n-butyl)thiophosphoric acid triamide (NBPT), which is one of the most prominent (thio)phosphoric acid derivatives in the art. Accordingly, the isolation processes described for NBPT can typically not be transferred to NPPT. This already transpires from the solubility in aromatic solvents. While NBPT can be dissolved in toluene as described in U.S. Pat. No. 8,513,460 B1, it is not possible to dissolve NPPT in toluene or dichloromethane in comparable amounts under the same conditions.

Therefore, the present invention relates to a process for isolating
at least one (thio)phosphoric acid derivative (1a), which has a melting point of at least 70° C., and which is selected from
(i)
(thio)phosphoric acid triamides according to general formula (I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
and
(ii)
(thio)phosphoric acid ester amides according to any one of general formula (IIa)

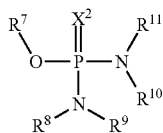
(IIa)

wherein
X² is O or S;
R⁷ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;
or general formula (IIb)

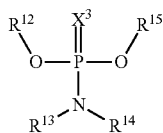
(IIb)

wherein
X³ is O or S;
R¹² is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
R¹⁵ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and
$C_1$-$C_4$-alkyl;
from a product mixture (1) comprising as components
(1a) the at least one (thio)phosphoric acid derivative;
(1b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl, and
(b2) alkali metal chlorides;
(1c) at least one polar solvent, which is selected from the group consisting of ester solvents and ether solvents; and
(1d) optionally at least one HCl scavenger;
wherein the process comprises at least the steps of
(a) heating the product mixture (1) to a temperature, which is sufficient for at least partly dissolving the at least one (thio)phosphoric acid derivative (1a);
(b) separating the solid material from the heated product mixture (1) to remove the at least one salt (1 b) and to obtain a solution comprising the at least one (thio)phosphoric acid derivative (1a), the at least one polar solvent (1c), and optionally the at least one HCl scavenger (1 d);
(c) causing solids formation of the at least one (thio)phosphoric acid derivative (1a) from the obtained solution by partly evaporating the at least one solvent (1c) from the solution and/or cooling the solution; and
(d) isolating the solid material.

In particular, the present invention relates to a process for isolating
N-(n-propyl)thiophosphoric acid triamide (NPPT)
from a product mixture (1) comprising as components
(1a) the N-(n-propyl)thiophosphoric acid triamide (NPPT);
(1b) at least one salt selected from the group consisting of
(b1) ammonium chloride ($NH_4Cl$); and
(b2) alkali metal chlorides;
(1c) at least one polar solvent, which is selected from the group consisting of ester solvents and ether solvents; and
(1d) optionally at least one HCl scavenger;
wherein the process comprises at least the steps of
(a) heating the product mixture (1) to a temperature, which is sufficient for at least partly dissolving the N-(n-propyl)thiophosphoric acid triamide (NPPT) (1a);
(b) separating the solid material from the heated product mixture (1) to remove the at least one salt (1b) and to obtain a solution comprising the N-(n-propyl)thiophosphoric acid triamide (NPPT) (1a), the at least one polar solvent (1c), and optionally the at least one HCl scavenger (1d);
(c) causing solids formation of the N-(n-propyl)thiophosphoric acid triamide (NPPT) (1a) from the obtained solution by partly evaporating the at least one solvent (1c) from the solution and/or cooling the solution; and
(d) isolating the solid material.

Preferably, the product mixture (1) comprises less than 1 wt.-% of water, based on the total weight of the product mixture (1), and no water is added in the process as solvent. Typically the water content in the product mixture (1) before and during the process of the invention is less than 1000 ppm, preferably less than 100 ppm.

Furthermore, it is preferred that the NPPT (1a) is isolated from the product mixture (1) by the process of the present invention, wherein said isolation process does not involve a phase-separation step and/or a distillation step to remove the solvent from the product mixture (1). Instead, according to the isolation process of the present invention, the NPPT is isolated directly from the product mixture (1) obtained by the process of preparing the NPPT without any intermediate work-up step.

The term "at least one" as used throughout herein above and below means one or more, preferably one or two, and thus typically refers to individual compounds or mixtures/combinations.

The term "at least" in connection with the process of the invention comprising at least the steps (a), (b), (c), and (d) clarifies that the process may also contain additional steps, e.g., a further recrystallization step after step (d).

Further embodiments of the present invention can be found in the claims, the description and the examples. Preferred embodiments of the process of the present invention are defined hereinafter. It is to be understood that the preferred embodiments are preferred on their own as well as in combination with each other.

DETAILED DESCRIPTION

In the following, the product mixture (1) as used in the process of the present invention is described in further detail.

The product mixture (1) is typically obtained after the two reactions of preparing a (thio)phosphoric acid derivative as outlined in detail above have been performed. Accordingly, apart from the desired product, the process solvent is typically present in the product mixture (1). In addition, salts are formed during the preparation process as HCl is set free and reacts with any basic compound in the product mixture (1). In addition, HCl scavengers, which are used as auxiliary agents, may be present in the product mixture.

Thus, product mixture (1) comprises as component (1a) the at least one (thio)phosphoric acid derivative, which is selected from (i) (thio)phosphoric acid triamides according to general formula (I), and (ii) (thio)phosphoric acid ester amides according to any one of general formula (IIa) or general formula (IIb); as component (1 b) at least one salt selected from the group consisting of (b1) ammonium salts according to general formula $H_2NR^{16}R^{17}Cl$, wherein $R^{16}$ and $R^{17}$ are independently of each other selected from the group consisting of H and $C_1$-$C_4$-alkyl, and (b2) alkali metal chlorides; as component (1c) at least one polar solvent, which is selected from the group consisting of ester solvents and ether solvents; and optionally as component (1d) at least one HCl scavenger.

In general, it is to be understood that component (1a) of product mixture (1) may comprise at least one, i.e. one or more, preferably one, two or three, especially preferably one or two (thio)phosphoric acid derivatives, which is indicated by the expression "at least one (thio)phosphoric acid derivative". Thus, the term "at least one (thio)phosphoric acid derivative" may refer to a single (thio)phosphoric acid derivative or to a mixture of two or more, preferably two or three (thio)phosphoric acid derivatives. Preferably, component (1a) of product mixture (1) comprises only one (thio)phosphoric acid derivative. In this connection, the term "at least one (thio)phosphoric acid derivative" is to be understood as "a (thio)phosphoric acid derivative" or "one (thio)phosphoric acid derivative".

It is to be understood that component (1b) of product mixture (1) may comprise either one or more than one, e.g. two or three, salts, which is indicated by the expression "at least one salt". Thus, one salt or a mixture of salts may be present in the product mixture (1). However, it is preferred that component (1 b) of product mixture (1) comprises only one salt. Accordingly, in preferred embodiments of the invention the term "at least one salt" is to be understood as "a salt" or "one salt".

It is to be understood that component (1c) of product mixture (1) may comprise either one or more than one, e.g. two or three, polar solvents, which is indicated by the expression "at least one polar solvent". Thus, one polar solvent or a mixture of polar solvents may be present in the product mixture (1). However, it is preferred that component (1c) of product mixture (1) comprises only one solvent. Accordingly, in preferred embodiments of the invention the term "at least one polar solvent" is to be understood as "a polar solvent" or "one polar solvent".

It is to be understood that the optional component (1d) of product mixture (1) may comprise either one or more than one, e.g. two or three, HCl scavengers, which is indicated by the expression "at least one HCl scavenger". Thus, one HCl scavenger or a mixture of HCl scavengers may be present in the product mixture (1). However, it is preferred that component (1d) of product mixture (1) comprises only one HCl scavenger. Accordingly, in preferred embodiments of the invention the term "at least one HCl scavenger" is to be understood as "a HCl scavenger" or "one HCl scavenger".

The following definitions and preferred embodiments apply with regard to the above mentioned components of product mixture (1).

As used herein, the term "(thio)phosphoric acid derivative" in each case covers thiophosphoric acid derivatives and phosphoric acid derivatives. Thus, the prefix "(thio)" as used herein in each case indicates that a group P=S or a group P=O is covered. Preferably, the term "(thio)phosphoric acid derivative" covers "(thio)phosphoric acid triamides", i.e. thiophosphoric acid triamides or phosphoric acid triamides, and "(thio)phosphoric acid ester amides", i.e. thiophosphoric acid ester amides or phosphoric acid ester amides. In connection with "(thio)phosphoric acid ester amides", it is to be understood that this term covers "(thio)phosphoric acid ester diamides" and "(thio)phosphoric acid diester amides". It is noted that the terms "(thio)phosphoric acid triamide" and "(thio)phosphoric triamide" may interchangeably be used. Similarly, the terms "(thio)phosphoric acid ester amide" and "(thio)phosphoric ester amide" may interchangeably be used.

As used herein, "(thio)phosphoric acid triamides" may be represented by the following general formula (I)

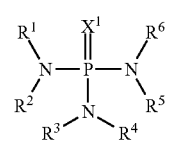

(I)

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl.

As used herein, "(thio)phosphoric acid ester amides" may be represented by any one of general formula (IIa)

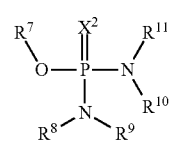

(IIa)

wherein $X^2$ is O or S;

$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and $R^8$, $R^9$, $R^{10}$, and $R^{11}$ are independently of each other selected from the group consisting of H and $C_1$-$C_4$-alkyl;

or general formula (IIb)

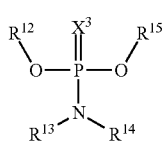

wherein
X³ is O or S;
R¹² is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
R¹⁵ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
R¹³ and R¹⁴ are independently of each other selected from the group consisting of H and $C_1$-$C_4$-alkyl;
wherein general formula (IIa) represents "(thio)phosphoric acid ester diamides" and general formula (IIb) represents "(thio)phosphoric acid diester amides".

The organic moieties mentioned in the above definitions of the variables are collective terms for individual listings of the individual group members. The prefix $C_n$-$C_m$ indicates in each case the possible number of carbon atoms in the group.

The term "alkyl" as used herein denotes in each case a straight-chain or branched alkyl group having usually from 1 to 20 carbon atoms, preferably from 1 to 10 carbon atoms, frequently from 1 to 6 carbon atoms, more preferably 1 to 4 carbon atoms, e.g. 3 or 4 carbon atoms. Examples of alkyl groups are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methyl pentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Preferred alkyl groups are methyl, ethyl, n-propyl, isopropyl, n-butyl, isobutyl, sec-butyl, tert-butyl, n-pentyl, isopentyl, neopentyl, tert-pentyl, hexyl, 2-methylpentyl, n-heptyl, n-octyl, 2-ethylhexyl, isooctyl, nonyl, isononyl, decyl, and isodecyl.

The term "cycloalkyl" as used herein denotes in each case a monocyclic cycloaliphatic radical having usually from 3 to 20 carbon atoms, preferably from 3 to 10 carbon atoms, more preferably from 3 to 6 carbon atoms, such as cyclopropyl, cyclobutyl, cyclopentyl, cyclohexyl, cycloheptyl, cyclooctyl, cyclononyl and cyclodecyl or cyclopropyl, cyclobutyl, cyclopentyl and cyclohexyl.

The term "aryl" includes mono-, bi- or tricyclic aromatic radicals having usually from 6 to 14, preferably 6, 10, or 14 carbon atoms. Exemplary aryl groups include phenyl, naphthyl and anthracenyl. Phenyl is preferred as aryl group.

The term "arylalkyl" refers to aryl as defined above, which is bonded via a $C_1$-$C_4$-alkyl group, in particular a methyl group (=arylmethyl), to the remainder of the molecule, examples including benzyl, 1-phenylethyl, 2-phenylethyl, etc.

The term "heterocycle" or "heterocyclyl" includes 5- or 6-membered monocyclic heterocyclic non-aromatic radicals. The heterocyclic non-aromatic radicals usually comprise 1 or 2 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-dioxothiopyranyl, dihydrothiopyranyl, S-oxodihydrothiopyranyl, S-dioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Preferred examples of heterocyclic radicals are piperazinyl, morpholinyl, pyrrolyl, pyrazolyl, triazolyl, oxazolyl, thiazolyl, and imidazolyl groups.

The term "(di)alkylaminocarbonyl" refers to a (di)alkylamino group, i.e. an amino group comprising 1 or 2 alkyl substituents, which is bonded to the remainder of the molecule via the carbon atom of a carbonyl group (C=O).

It is to be understood that, preferably, also stereoisomers, tautomers, N-oxides, and salts of the (thio)phosphoric acid derivatives are covered by the term "(thio)phosphoric acid derivative". Stereoisomers are present, if the compounds contain one or more centers of chirality. In this case, the compounds will be present in the form of different enantiomers or diastereomers, if more than one center of chirality is present. The term "(thio)phosphoric acid derivative" preferably covers every possible stereoisomer, i.e. single enantiomers or diastereomers, as well as mixtures thereof. Tautomers include, e.g., keto-enol tautomers. N-oxides may be formed under oxidative conditions, if tertiary amino groups are present. Salts may be formed, e.g., with the basic amino groups of the (thio)phosphoric acid derivative. Anions, which stem from an acid, with which the (thio)phosphoric acid derivative may have been reacted, are e.g. chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate.

The (thio)phosphoric acid derivatives according to the invention, of which at least one, preferably one, may be present as component (1a) in the product mixture (1), have a melting point of at least 70° C., preferably at least 75° C., more preferably at least 80° C., most preferably at least 85° C. As already outlined above, these (thio)phosphoric acid derivatives typically show dissolution properties, which differ from lower melting (thio)phosphoric acid derivatives such as NBPT. Typically, the melting point of the (thio)phosphoric acid derivatives is at most 200° C., preferably at most 185° C., more preferably at most 150° C., even more preferably at most 120° C., most preferably at most 100° C.

In connection with the melting points as provided herein above and below, it is to be understood that the defined melting points preferably refer to the melting points of the (thio)phosphoric acid derivatives in pure form, i.e. not contaminated with impurities of more than 5 wt.-%, preferably not contaminated with impurities of more than 2 wt.-%, and not in the form of a mixture with another (thio) phosphoric acid derivative.

In one embodiment of the invention, the at least one (thio)phosphoric acid derivative (1a) having a melting point of at least 70° C. is selected from
(i)
(thio)phosphoric acid triamides according to general formula (I)

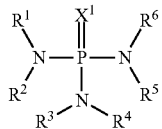

(I)

wherein
$X^1$ is O or S;
$R^1$ is $C_1$-$C_8$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H;
and
(ii)
(thio)phosphoric acid ester amides according to any one of general formula (IIa)

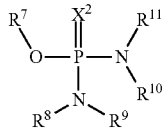

(IIa)

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
or general formula (IIb)

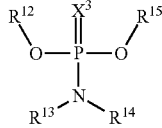

(IIb)

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and $R^{13}$ and $R^{14}$ are each H.

In one preferred embodiment of the invention, the at least one (thio)phosphoric acid derivative (1a) is selected from
(ii)
(thio)phosphoric acid triamides according to general formula (I)

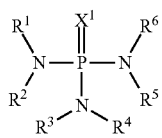

(I)

wherein
$X^1$ is O or S;
$R^1$ is $C_1$-$C_8$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H.

In one preferred embodiment of the invention, the at least one (thio)phosphoric acid derivative (1a) is selected from
(ii)
(thio)phosphoric acid ester amides according to any one of general formula (IIa)

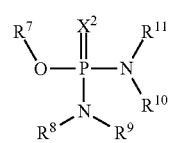

(IIa)

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
or general formula (IIb)

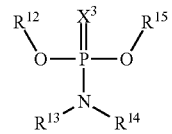

(IIb)

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and
$R^{13}$ and $R^{14}$ are each H.

It is preferred that the at least one (thio)phosphoric acid derivative (1a) is selected from (thio)phosphoric acid triamides according to general formula (I).

In one particularly preferred embodiment of the invention, the at least one (thio)phosphoric acid derivative (1a) is selected from (thio)phosphoric acid triamides according to general formula (I),
wherein
$X^1$ is S;
$R^1$ is $C_1$-$C_6$-alkyl, $C_5$-$C_6$-cycloalkyl, phenyl, or benzyl;
$R^2$ is H or $C_1$-$C_4$-alkyl; and
$R^3$, $R^4$, $R^5$, and $R^6$ are each H;
and wherein preferably
$X^1$ is S;
$R^1$ is $C_1$-$C_8$-alkyl;
$R^2$ is H or $C_1$-$C_4$-alkyl; and
$R^3$, $R^4$, $R^5$, and $R^6$ are each H.

In one embodiment of the invention, the at least one (thio)phosphoric acid derivative (1a) having a melting point of at least 70° C. is selected from the group consisting of
N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide; O-ethylphosphoric acid ester diamide, O-phenylthiophosphoric acid ester diamide, O,O-diphenylphosphoric acid diester amide, and O-phenylphosphoric acid ester diamide.

In a preferred embodiment of the invention, the at least one (thio)phosphoric acid derivative (1a) has a melting point of at least 75° C., preferably at least 80° C., more preferably at least 85° C.

Preferred (thio)phosphoric acid derivatives with a melting point of at least 85° C. are selected from the group consisting of N-(n-propyl)thiophosphoric acid triamide, N,N-diisopropylthiophosphoric acid triamide, N,N-dimethylthiophosphoric acid triamide, N-(n-octyl) phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

In one embodiment of the invention, the at least one (thio)phosphoric acid derivative is N,N-diethylphosphoric acid triamide having the following chemical formula

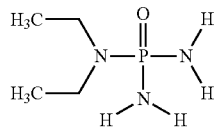

In another embodiment of the invention, the at least one (thio)phosphoric acid derivative is N-(n-propyl)thiophosphoric acid triamide having the following chemical formula:

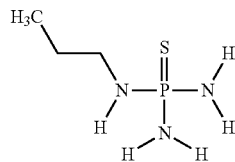

In another embodiment of the invention, the at least one (thio)phosphoric acid derivative is N,N-diisopropylthiophosphoric acid triamide having the following chemical formula:

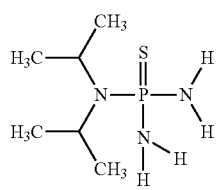

In another embodiment of the invention, the at least one (thio)phosphoric acid derivative is N,N-dimethylthiophosphoric acid triamide having the following chemical formula:

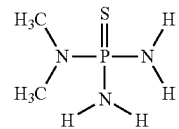

In another embodiment of the invention, the at least one (thio)phosphoric acid derivative is N-(n-octyl)phosphoric acid triamide having the following chemical formula:

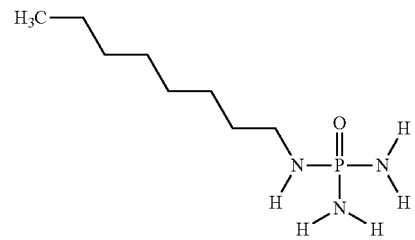

In another embodiment of the invention, the at least one (thio)phosphoric acid derivative is N-(n-butyl)phosphoric acid triamide having the following chemical formula:

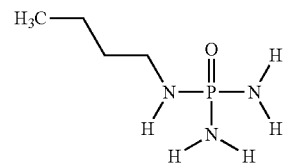

In another embodiment of the invention, the at least one (thio)phosphoric acid derivative is N-cyclohexylphosphoric acid triamide having the following chemical formula:

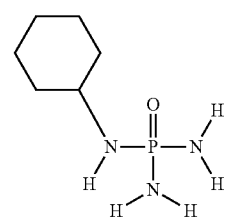 [SMILES: NP(N)(=O)NC1CCCCC1]

In another embodiment of the invention, the at least one (thio)phosphoric acid derivative is N-benzyl-N-methylphosphoric acid triamide having the following chemical formula:

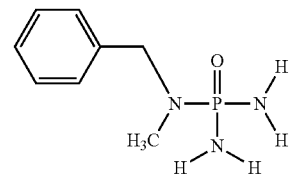

In another embodiment of the invention, the at least one (thio)phosphoric acid derivative is N,N-dimethylphosphoric acid triamide having the following chemical formula:

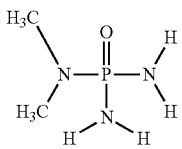

In another embodiment of the invention, the at least one (thio)phosphoric acid derivative is N-cyclohexylthiophosphoric acid triamide having the following chemical formula:

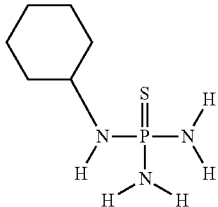 [SMILES: NP(N)(=S)NC1CCCCC1]

In another embodiment of the invention, the at least one (thio)phosphoric acid derivative is O-ethylphosphoric acid ester diamide having the following chemical formula:

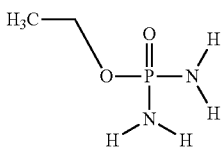

In another embodiment of the invention, the at least one (thio)phosphoric acid derivative is O-phenylthiophosphoric acid ester diamide having the following chemical formula:

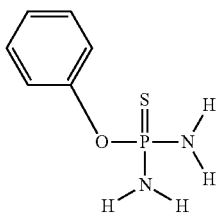

In another embodiment of the invention, the at least one (thio)phosphoric acid derivative is O,O-diphenylphosphoric acid diester amide having the following chemical formula:

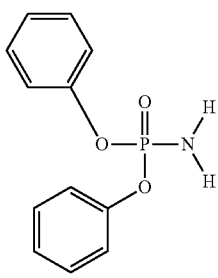 [SMILES: NP(=O)(Oc1ccccc1)Oc1ccccc1]

In another embodiment of the invention, the at least one (thio)phosphoric acid derivative is O-phenylphosphoric acid ester diamide having the following chemical formula:

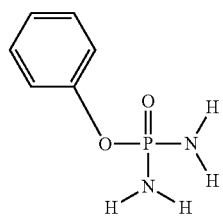 [SMILES: NP(N)(=O)Oc1ccccc1]

In one preferred embodiment of the present invention, component (1a) of product mixture (1) comprises one of the above listed (thio)phosphoric acid derivatives, and does not comprise any further (thio)phosphoric acid derivatives.

It is preferred according to the invention that component (1a) of product mixture (1) is N-(n-propyl)thiophosphoric acid triamide (NPPT). As already outlined above, NPPT has significantly different solubility properties compared to the commonly described N-(n-butyl)thiophosphoric acid triamide (NBPT). In addition, the high melting point of 91° C. of NPPT may cause further difficulties in this connection as the dissolution process cannot be enhanced by melting, when moderate temperatures below the melting point of NPPT are applied. However, as NPPT is also of commercial importance due to its combined use with NBPT, the process of the present invention has a particular focus on the isolation of NPPT.

Thus, in one embodiment of the invention, the at least one (thio)phosphoric acid derivative is N-(n-propyl)thiophosphoric acid triamide (NPPT).

The salt, which represents component (1 b) of the product mixture (1), is typically a chloride salt in view the fact that HCl is set free in the preparation of the (thio)phosphoric acid derivative. As the preparation of the (thio)phosphoric acid derivative generally requires the use of a nucleophile, which is an amine ($HNR^{16}R^{17}$) or an alkali metal amide ($MNR^{16}R^{17}$) or in certain situations also, e.g., an alcoholate ($MOR^{17}$), wherein $R^{16}$ and $R^{17}$ are in each case independently selected from H and $C_1$-$C_4$-alkyl, and wherein M is an alkali metal (preferably sodium), ammonium salts according to general formula $H_2NR^{16}R^{17}Cl$ or alkali metal chlorides are formed as side-products, and have to be removed from the product mixture.

In one embodiment, the at least one salt (1 b) of the product mixture (1) is selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl, and
(b2) alkali metal chlorides;

In a preferred embodiment, the at least one salt (1b) is ammonium chloride ($NH_4Cl$) or NaCl.

In a particularly preferred embodiment, the at least one salt (1b) is ammonium chloride ($NH_4Cl$).

The preference with regard to ammonium chloride results from the fact that ammonia is preferably used as a nucleophile in the second reaction of the preparation of (thio)phosphoric acid derivatives. Ammonia is preferably used in sufficient amounts that it can act as a reactant and as an HCl scavenger, which requires at least 4 equivalents of ammonia. Even more preferably, ammonia is used in an amount, which is also sufficient to set free the protonated HCl scavenger of the first reaction of the preparation of the (thio)phosphoric acid derivative, so that at least 5 equivalents of ammonia are used. In any case, when ammonia acts as a base in the preparation process of (thio)phosphoric acid derivatives, ammonium chloride is formed, and has to be removed from the product mixture.

The use of ammonia is also preferred in connection with the preparation of NPPT as the n-propylamine is typically introduced in the first reaction, while the remaining amino groups ($NH_2$-groups) are introduced in the second reaction of the preparation process by using ammonia as a nucleophile and as HCl scavenger, which results in the formation of ammonium chloride.

Alternatively, NPPT can be prepared by using an alkali metal amide ($MNH_2$), preferably sodium amide ($NaNH_2$) in the second reaction of the preparation process, which results in the formation of an alkali metal chloride, preferably sodium chloride.

It is therefore preferred that the product mixture (1) comprises as component (1a) NPPT, and as component (1b) ammonium chloride and/or sodium chloride.

In a preferred embodiment, the product mixture (1) comprises as component (1a) NPPT, and as component (1b) ammonium chloride.

The polar solvent, which represents component (1c) of the product mixture (1) is of particular relevance for the process of the invention. In particular, it is the surprising finding of the present invention that a polar solvent, which is selected from the group consisting of ester solvents and ether solvents, allows for the straightforward isolation process as described herein, if (thio)phosphoric acid derivatives have to be isolated, for which the solvents commonly used for NBPT are unsuitable. In particular, it has been found that it is possible to dissolve the at least one (thio)phosphoric acid derivative (1a) as defined herein in these solvents already at moderately increased temperatures of, e.g., from 30° C. to 80° C., preferably from 40 to 60° C., so that the at least one salt (1b) of the product mixture (1) may be removed, e.g., by filtration. Furthermore, it is then easily possible to cause solids formation of the at least one (thio)phosphoric acid derivative (1a) by partly evaporating the at least one solvent (1c) from the solution and/or cooling the solution.

In one embodiment, the at least one polar solvent (1c) of the product mixture (1) is therefore selected from the group consisting of ether solvents and ester solvents.

Preferred ether solvents generally include cyclic and acyclic ethers selected from the group consisting of tetrahydrofuran, 2-methyltetrahydrofuran, 1,4-dioxane, diethyl ether, diisopropyl ether, di-n-propyl ether, di-n-butyl ether, methyl-tert-butyl ether, diisobutyl ether, and dimethoxyethane.

Preferred ester solvents generally include acyclic carboxylic acid esters selected from ethyl acetate, propyl acetate, isopropyl acetate, butyl acetate, and isobutyl acetate.

The isolation process is preferably performed with a product mixture comprising as component (1c) a cyclic ether such as tetrahydrofuran or 2-methyltetrahydrofuran, or an acyclic carboxylic acid ester such as ethyl acetate.

In one embodiment, the at least one polar solvent is thus selected from cyclic ethers and acyclic carboxylic acid esters.

In a preferred embodiment, the at least one polar solvent is selected from tetrahydrofuran, 2-methyltetrahydrofuran, and ethyl acetate.

In one particularly preferred embodiment, the at least one polar solvent is tetrahydrofuran.

In one particularly preferred embodiment, the at least one polar solvent is 2-methyltetrahydrofuran.

In one particularly preferred embodiment, the at least one polar solvent is ethyl acetate.

The above mentioned preferred polar solvents are also particularly preferred as components (1c) in connection with product mixtures comprising NPPT as component (1a). These solvents allow for a particularly advantageous temperature range for the isolation of NPPT according to the process of the invention.

In one embodiment of the invention, it is therefore preferred that the product mixture (1) comprises as component (1a) NPPT, and as component (1c) tetrahydrofuran.

In one embodiment of the invention, it is therefore preferred that the product mixture (1) comprises as component (1a) NPPT, and as component (1c) 2-methyltetrahydrofuran.

In one embodiment of the invention, it is therefore preferred that the product mixture (1) comprises as component (1a) NPPT, and as component (1c) ethyl acetate.

Furthermore, the following combinations are preferred for the components (1b) and (1c) of the product mixture (1).

In one embodiment of the invention, the product mixture (1) comprises as component (1b) ammonium chloride, and as component (1c) tetrahydrofuran.

In one embodiment of the invention, the product mixture (1) comprises as component (1b) ammonium chloride, and as component (1c) 2-methyltetrahydrofuran.

In one embodiment of the invention, the product mixture (1) comprises as component (1b) ammonium chloride, and as component (1c) ethyl acetate.

In one embodiment of the invention, the product mixture (1) comprises as component (1b) sodium chloride, and as component (1c) tetrahydrofuran.

In one embodiment of the invention, the product mixture (1) comprises as component (1b) sodium chloride, and as component (1c) 2-methyltetrahydrofuran.

In one embodiment of the invention, the product mixture (1) comprises as component (1b) sodium chloride, and as component (1c) ethyl acetate.

Thus, in one embodiment of the invention, the product mixture (1) comprises as component (1a) NPPT, and as components (1b) and (1c) a combination according to one row of the following table A

TABLE A

| A | Comp. (1b) | Comp. (1c) |
|---|---|---|
| (A)-1 | $NH_4Cl$ | EtOAc |
| (A)-2 | $NH_4Cl$ | THF |
| (A)-3 | $NH_4Cl$ | $CH_3$—THF |
| (A)-4 | NaCl | EtOAc |
| (A)-5 | NaCl | THF |
| (A)-6 | NaCl | $CH_3$—THF |

EtOAc = ethyl acetate
THF = tetrahydrofuran
$CH_3$—THF = 2-methyltetrahydrofuran
NH4Cl = ammonium chloride
NaCl = sodium chloride The product mixture (1) may further comprise at least one HCl scavenger as component (1d).

A skilled person understands that the term "HCl scavenger" covers any compound, which is suitable for taking up protons, in the present case protons, which are set free in the preparation of the (thio)phosphoric acid derivatives. In other words, an HCl scavenger is preferably to be understood as a base, and is preferably an amine.

As used herein, the term "HCl scavenger" in connection with component (1d) of product mixture (1) refers to a base, preferably a tertiary amine, which may be present in the product mixture (1), as HCl scavengers are advantageous in particular in the first reaction of the preparation of (thio) phosphoric acid derivatives as described above for the reason that HCl is set free in the process. As an excess of ammonia is typically used in the second reaction, an additional HCl scavenger is typically not required. Instead, the HCl scavenger as used in the first reaction, which may still be present in the reaction mixture, when performing the second reaction, will typically again be deprotonated. Accordingly, the HCl scavenger is typically present in its deprotonated form in the product mixture (1) as defined herein. Thus, if the HCl scavenger is a tertiary amine, it will preferably be present in the form of the amine and not in the form of the corresponding ammonium salt.

In one embodiment, the at least one HCl scavenger (1d) is an amine, preferably an amine, which is sterically hindered, so that it cannot act as a base.

In a preferred embodiment, the at least one HCl scavenger (1d) is a tertiary amine.

Suitable HCl scavengers according to the invention include heterocyclic tertiary amines, such as pyridine, 4-chloropyridine, 3-ethynylpyridine, 4-ethylpyridine, 2-picoline, 3-picoline, and 4-picoline; or trialkyl amines selected from N,N-diethylmethylamine, triethylamine, tri-n-propylamine, and tri-sec-butylamine. Relatively low-boiling tertiary amines such as pyridine, 2-picoline, N,N-diethylmethylamine, triethylamine, and tri-n-propylamine, can be preferred.

In a preferred embodiment of the invention, the at least one HCl scavenger (1d) of the product mixture (1) is triethylamine, tri-n-propylamine, or tri-n-butylamine.

In a more preferred embodiment of the invention, the at least one HCl scavenger (1d) of the product mixture (1) is triethylamine, or tri-n-propylamine.

In one embodiment, the at least one HCl scavenger (1d) is triethylamine ($N(CH_2CH_3)_3$).

In one embodiment, the at least one HCl scavenger (1d) is tri-n-propylamine ($N(CH_2CH_2CH_3)_3$).

In one embodiment, the at least one HCl scavenger (1d) is tri-n-butylamine ($N(CH_2CH_2CH_2CH_3)_3$).

Product mixtures (1) with the following combinations of components (1a) and (1d) are preferred according to the invention.

In one embodiment of the invention, the product mixture (1) comprises as component (1a) NPPT, and as component (1d) triethylamine.

In one embodiment of the invention, the product mixture (1) comprises as component (1a) NPPT, and as component (1d) tri-n-propylamine.

In one embodiment of the invention, the product mixture (1) comprises as component (1a) NPPT, and as component (1d) tri-n-butylamine.

Furthermore, product mixtures (1) with the following combinations of components (1b) and (1d) are preferred according to the invention.

In one embodiment of the invention, the product mixture (1) comprises as component (1b) ammonium chloride, and as component (1d) triethylamine.

In one embodiment of the invention, the product mixture (1) comprises as component (1b) ammonium chloride, and as component (1d) tri-n-propylamine.

In one embodiment of the invention, the product mixture (1) comprises as component (1b) ammonium chloride, and as component (1d) tri-n-butylamine In one embodiment of the invention, the product mixture (1) comprises as component (1b) sodium chloride, and as component (1d) triethylamine.

In one embodiment of the invention, the product mixture (1) comprises as component (1b) sodium chloride, and as component (1d) tri-n-propylamine.

In one embodiment of the invention, the product mixture (1) comprises as component (1b) sodium chloride, and as component (1d) tri-n-butylamine.

Furthermore, product mixtures (1) with the following combinations of components (1c) and (1d) are preferred according to the invention.

In one embodiment of the invention, the product mixture (1) comprises as component (1c) tetrahydrofuran, and as component (1d) triethylamine.

In one embodiment of the invention, the product mixture (1) comprises as component (1c) tetrahydrofuran, and as component (1d) tri-n-propylamine.

In one embodiment of the invention, the product mixture (1) comprises as component (1c) tetrahydrofuran, and as component (1d) tri-n-butylamine In one embodiment of the invention, the product mixture (1) comprises as component (1c) 2-methyltetrahydrofuran, and as component (1d) triethylamine.

In one embodiment of the invention, the product mixture (1) comprises as component (1c) 2-methyltetrahydrofuran, and as component (1d) tri-n-propylamine.

In one embodiment of the invention, the product mixture (1) comprises as component (1c) 2-methyltetrahydrofuran, and as component (1d) tri-n-butylamine.

In one embodiment of the invention, the product mixture (1) comprises as component (1c) ethyl acetate, and as component (1d) triethylamine.

In one embodiment of the invention, the product mixture (1) comprises as component (1c) ethyl acetate, and as component (1d) tri-n-propylamine.

In one embodiment of the invention, the product mixture (1) comprises as component (1c) ethyl acetate, and as component (1d) tri-n-butylamine.

In view of the above, the product mixture (1) as used in the process of the present invention preferably comprises as components
  (1a) NPPT;
  (1b) at least one salt selected from ammonium chloride and sodium chloride;
  (1c) at least one polar solvent selected from tetrahydrofuran, 2-methyltetrahydrofuran, and ethyl acetate; and
  (1d) optionally at least one HCl scavenger selected from triethylamine, tri-n-propylamine, and tri-n-butylamine.

Preferably, the product mixture (1) as used in the process of the present invention comprises as components
  (1a) NPPT;
  (1 b) ammonium chloride;
  (1c) at least one polar solvent selected from tetrahydrofuran, 2-methyltetrahydrofuran, and ethyl acetate; and
  (1d) optionally at least one HCl scavenger selected from triethylamine, tri-n-propylamine, and tri-n-butylamine.

More preferably, the product mixture (1) as used in the process of the present invention comprises as components
  (1a) NPPT;
  (1b) ammonium chloride;
  (1c) at least one polar solvent selected from tetrahydrofuran, 2-methyltetrahydrofuran, and ethyl acetate; and
  (1d) at least one HCl scavenger selected from triethylamine, and tri-n-propylamine.

Particularly preferably, the product mixture (1) as used in the process of the present invention preferably comprises as components (1a) NPPT;
(1b) ammonium chloride;
(1c) at least one polar solvent selected from tetrahydrofuran, 2-methyltetrahydrofuran, and ethyl acetate; and
(1d) tri-n-propylamine.

In this connection, the use of ethyl acetate as a solvent may be particularly preferred.

In one embodiment of the invention, the product mixture (1) comprises as component (1a) NPPT, and as components (1b) and (1c) a combination according to one row of the following table A, and as component (1d) triethylamine.

In another embodiment of the invention, the product mixture (1) comprises as component (1a) NPPT, and as components (1b) and (1c) a combination according to one row of the following table A, and as component (1d) tri-n-propylamine.

In yet another embodiment of the invention, the product mixture (1) comprises as component (1a) NPPT, and as components (1b) and (1c) a combination according to one row of the following table A, and as component (1d) tri-n-butylamine.

TABLE A

| A | Comp. (1b) | Comp. (1c) |
| --- | --- | --- |
| (A)-1 | NH$_4$Cl | EtOAc |
| (A)-2 | NH$_4$Cl | THF |
| (A)-3 | NH$_4$Cl | CH$_3$—THF |
| (A)-4 | NaCl | EtOAc |
| (A)-5 | NaCl | THF |
| (A)-6 | NaCl | CH$_3$—THF |

EtOAc = ethyl acetate
THF = tetrahydrofuran
CH$_3$—THF = 2-methyltetrahydrofuran
NH$_4$Cl = ammonium chloride
NaCl = sodium chloride In one embodiment of the invention, components (1a), (1b), (1c), and (1d) of product mixture (1) are together present in an amount of at least 75 wt.-%, preferably at least 85 wt.-%, more preferably at least 95 wt.-%, based on the total weight of the product mixture (1).

In one embodiment of the invention, component (1a) is present in the product mixture (1) in an amount of from 5 wt.-% to 35 wt.-%, preferably 8 wt.-% to 15 wt.-%, based on the total weight of the product mixture (1).

Component (1b) and component (1a) are typically present in a molar ratio of at least 2:1, because two equivalents of salt are formed in the second reaction of the preparation of the (thio)phosphoric acid derivative. Preferably, the molar ratio is at least 3:1, as an additional amount of salt may be formed by deprotonating the HCl scavenger as used in the first reaction.

The relative amount of component (1c) depends on the solubility of the starting materials of the process. Typically, the amount of component (1c) does not suffice to dissolve component (1a) partly, or even completely. Instead, a heating step is required for dissolution as outlined below.

As already indicated above, the process for isolating the at least one (thio)phosphoric acid derivative (1a) as defined above from the product mixture (1) as defined above, comprises at least the steps of
(a) heating the product mixture (1) to a temperature, which is sufficient for at least partly dissolving the at least one (thio)phosphoric acid derivative (1a);
(b) separating the solid material from the heated product mixture (1) to remove the at least one salt (1b) and to obtain a solution comprising the at least one (thio) phosphoric acid derivative (1a), the at least one polar solvent (1c), and optionally the at least one HCl scavenger (1d);
(c) causing solids formation of the at least one (thio) phosphoric acid derivative (1a) from the obtained solution by partly evaporating the at least one solvent (1c) from the solution and/or cooling the solution; and
(d) isolating the solid material.

The process of the invention is principally concerned with a solids separation problem in view of the fact that the product mixture (1) as defined herein comprises two solid components, namely the (thio)phosphoric acid derivative (1a) and the at least one salt (1b), from which only the (thio)phosphoric acid derivative (1a) shall be isolated. It is therefore required to remove one solid component from the product mixture without the other, i.e. to obtain a suspension comprising only one solid component from a suspension comprising two solid components. In this connection, the process of the invention is based on the concept of first dissolving the (thio)phosphoric acid derivative (1a), so that the product mixture no longer contains two solid components, but preferably only one solid component, namely the at least one salt (1b). It is then possible to remove the at least one salt (1b) from the product mixture (1), and to cause solids formation of the (thio)phosphoric acid derivative (1a) afterwards to provide the desired product in a high purity. It has surprisingly been found by the inventors that, if ether solvents or ester solvents are present in the product mixture (1), this process can be realized in an advantageous temperature range, which only requires moderately heating the product mixture (1) to a temperature of, e.g., from 30° C. to 80° C. in order to dissolve the (thio)phosphoric acid derivative (1a), while it is then possible to cause solids formation at moderately decreased temperatures of, e.g., from −20° C. to 25° C.

In order to increase the yields, it is of course advantageous, if the (thio)phosphoric acid derivative (1a) is dissolved to a large extent in step (a) of the process. Accordingly, the term "at least partly dissolved" in connection with step (a) of the process preferably means that at least 50 wt.-%, preferably at least 75 wt.-%, more preferably at least 85 wt.-%, most preferably at least 95 wt.-% based on the total amount of the (thio)phosphoric acid derivative (1a) in the product mixture (1) are dissolved. It is particularly preferred that the (thio)phosphoric acid derivative (1a) is dissolved completely, which is to be understood as such that at least 98 wt.-%, preferably at least 99 wt.-% based on the total amount of the (thio)phosphoric acid derivative (1a) in the product mixture (1) are dissolved.

Similarly, the step of causing solids formation of the (thio)phosphoric acid derivative (1a) should preferably ensure that the (thio)phosphoric acid derivative (1a) solidifies to a large extent. Accordingly, "causing solids formation" preferably means that at least 50 wt. %, preferably at least 75 wt.-%, preferably at least 85 wt.-%, more preferably at least 90 wt.-% based on the total amount of the (thio) phosphoric acid derivative (1a) in the solution obtained in step (b) solidifies.

As already indicated above, moderately heating of the product mixture (1) is sufficient for at least partly, preferably completely dissolving the (thio)phosphoric acid derivative (1a). In one embodiment of the process of the invention, in step (a), the product mixture is heated to a temperature of at least 30° C., preferably to a temperature in the range of from 30° C. to 80° C., more preferably to a temperature in the range of from 40° C. to 60° C.

A temperature in the range of from 40° C. to 60° C. is particularly advantageous as it provides an optimized balance between improving dissolution and avoiding thermal stress for the desired product.

In step (b) of the process of the invention, the solid material, i.e. the at least one salt (1b) is removed from the heated product mixture obtained in step (a), wherein the (thio)phosphoric acid derivative is at least partly, preferably completely dissolved, so that yield losses can be avoided.

A skilled person will understand that the removal of the solid material in step (b) has to be performed with the product mixture obtained in step (a) being maintained in heated form. Preferably, the temperature of the heated product mixture obtained in step (a) should not decrease by more than 10° C. upon removal of the solid material in step (c) in order to avoid yield losses due to solids formation of the desired (thio)phosphoric acid derivative.

Suitable techniques for removing solid material from a solution are known to a skilled person.

In one embodiment, in step (b), the solid material is separated from the heated product mixture (1) by filtration.

In step (c), the solution obtained in step (b), which comprises the at least one (thio)phosphoric acid derivative (1a), the at least one polar solvent (1c), and optionally the at least one HCl scavenger (1d), but from which the at least one salt (1b) has been removed, is further processed.

It has surprisingly been found by the inventors of the present invention that solids formation of the of the at least one (thio)phosphoric acid derivative (1a) can be caused by simple techniques, i.e. by partly evaporating the at least one solvent (1c) from the solution and/or cooling the solution. However, it is typically not required to reduce the solubility of the desired product by adding an additional solvent with lower polarity.

Thus, in one embodiment, in step (c), no additional solvent is added to the solution obtained in step (b) in order to cause solids formation.

If it is required to reduce the solubility of the desired product, it has been found that at least one tertiary amine, which may in any case be present in the product mixture (1) as an HCl scavenger, can be added to the solution in step (c) to cause solids formation. Preferably, the tertiary amine corresponds to the HCl scavenger, so that no additional chemical is added to the solution. Thus, the tertiary amine is preferably triethylamine, tri-n-propylamine, or tri-n-butylamine, and particularly preferably triethylamine, or tri-n-propylamine, and is selected such that it corresponds to the HCl scavenger, which is present in the solution obtained in step (b). In particular, it has been found that, if ethyl acetate is present as the polar solvent (1c) in the product mixture (1) and the solution obtained in step (b), respectively, the solubility of the (thio)phosphoric acid derivative can advantageously be reduced by adding tri-n-propylamine, so that solids formation is enhanced.

However, it is preferred that no additional chemical is added to the solution obtained in step (b), when causing solids formation in step (c) of the process, in order to avoid separation, recycling and/or disposal of the additional chemical.

Rather, solids formation may be caused by partly evaporating the at least one solvent (1c) from the solution and/or cooling the solution. In this connection, partly evaporating the at least one solvent (1c) means that at least 20 wt.-%, preferably at least 40 wt.-%, more preferably at least 60 wt.-% of the solvent are evaporated. A skilled person is able to identify the required amount of solvent to be evaporated in order to cause solids formation.

In a preferred embodiment, solids formation is caused by simply cooling the solution obtained in step (b).

Thus, in one preferred embodiment, in step (c), the solution obtained in step (b) is cooled to a temperature in the range of from −20° C. to 25° C., preferably −10° C. to 15° C., more preferably −5° C. to 5° C.

A skilled person is aware that the term "solids formation" covers precipitation and crystallization. Thus, the (thio)phosphoric acid derivative (1a) may solidify in amorphous or crystalline form. Preferably, crystallization is caused in step (c) of the process of the invention, so that crystals of the (thio)phosphoric acid derivative (1a) are formed.

Step (d) covers the isolation of the desired (thio)phosphoric acid derivative (1a).

Suitable techniques for isolating a solid material from a solution are known to a skilled person.

In one embodiment, in step (d), the solid material is isolated by separating the solid material from the mother liquor, and washing and drying it.

Isolation of the solid material may be performed, e.g., by filtration.

For washing the solid material, it is preferred to use the process solvent, which was in any case present in the product mixture (1), so that no additional chemical is introduced. The use of the polar solvent as present in the product mixture (1) also has the advantage that these solvents can typically be easily removed under reduced pressure. This particularly applies to the preferred solvents tetrahydrofuran, 2-methyltetrahydrofuran, and ethyl acetate, as these solvents have low boiling points.

However, washing may also be performed with a different solvent, which is preferably selected from alkanes such as pentane, hexane, cyclohexane, isohexane, isooctane, 2,2,4-trimethylpentane, or petrol ether, and preferably has a boiling point below 100° C.

In order to avoid thermal decomposition of the product, it is preferred to perform drying at a temperature, which is below the melting point of the (thio)phosphoric acid derivative, preferably in a range of from 50° C. to 70° C. Furthermore, it can be preferred to perform drying under reduced pressure, so that even lower temperatures, e.g., in the range of from 20° C. to 50° C. may suffice.

After washing and drying has been performed, the solid material is preferably isolated in a very high purity, although no further re-crystallization step has been performed.

In one embodiment, the solid material isolated in step (d) comprises the at least one (thio)phosphoric acid derivative in a purity of at least 90 wt.-% based on the total weight of the solid material, preferably in a purity of at least 97 wt.-%.

A purity of at least 98 wt.-%, preferably at least 99 wt.-% may be obtained after re-crystallization. Suitable solvents for re-crystallization may be selected from the polar solvents as defined above. Preferred solvents for re-crystallization thus include tetrahydrofuran, 2-methyltetrahydrofuran, and ethyl acetate.

As already indicated above, the isolation process according to the present invention is typically performed after the preparation process of preparing the desired (thio)phosphoric acid derivative (1a).

Therefore, in one embodiment, the process of the invention further comprises preparing the at least one (thio)phosphoric acid derivative (1a), wherein the (thio)phosphoric acid triamides according to general formula (I) are prepared by reacting at least one N-hydrocarbylamino(thio)phosphoryl dichloride according to general formula (III)

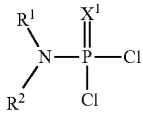

(III)

wherein
X$^1$, R$^1$, and R$^2$ are as defined in above
with
1) at least one amine according to general formula HNR$^{16}$R$^{17}$,
wherein
R$^{16}$ and R$^{17}$ are independently of each other selected from the group consisting of H and C$_1$-C$_4$-alkyl,
and/or
2) at least one amide according to general formula MNR$^{16}$R$^{17}$,
wherein
R$^{16}$ and R$^{17}$ are independently of each other selected from the group consisting of H and C$_1$-C$_4$-alkyl, and
M is an alkali metal;
in at least one polar solvent, which is selected from the group consisting of ester solvents and ether solvents,
to obtain a product mixture (1.1) comprising as components
(1.1a) at least one (thio)phosphoric acid triamide according to general formula (I), wherein
X$^1$, R$^1$, R$^2$, R$^3$, R$^4$, R$^5$, and R$^6$ are as defined above;
(1.1b) at least one salt selected from the group consisting of
(b1) ammonium salts according to general formula H$_2$NR$^{16}$R$^{17}$Cl
wherein
R$^{16}$ and R$^{17}$ are independently of each other selected from the group consisting of H and C$_1$-C$_4$-alkyl,
and
(b2) alkali metal chlorides;
and
(1.1c) at least one polar solvent, which is selected from the group consisting of ester solvents and ether solvents;
and wherein the (thio)phosphoric acid ester amides according to general formula (IIa) are prepared by reacting
at least one O-hydrocarbyloxy(thio)phosphoryl dichloride according to general formula (IV)

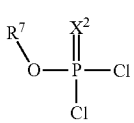

(IV)

wherein
X$^2$ and R$^7$ are as defined above,
with
1) at least one amine according to general formula HNR$^{16}$R$^{17}$,
wherein
R$^{16}$ and R$^{17}$ are independently of each other selected from the group consisting of H and C$_1$-C$_4$-alkyl,
and/or
2) at least one amide according to general formula MNR$^{16}$R$^{17}$,
wherein
R$^{16}$ and R$^{17}$ are independently of each other selected from the group consisting of H and C$_1$-C$_4$-alkyl, and
M is an alkali metal;
in at least one polar solvent, which is selected from the group consisting of ester solvents and ether solvents,
to obtain a product mixture (1.2) comprising as components
(1.2a) at least one (thio)phosphoric acid ester amide according to general formula (IIa),
wherein X$^2$, R$^7$, R$^8$, R$^9$, R$^{10}$, and R$^{11}$ are as defined above;
(1.2b) at least one salt selected from the group consisting of
(b1) ammonium salts according to general formula H$_2$NR$^{16}$R$^{17}$Cl
wherein
R$^{16}$ and R$^{17}$ are independently of each other selected from the group consisting of H and C$_1$-C$_4$-alkyl,
and
(b2) alkali metal chlorides;
and
(1.2c) at least one polar solvent, which is selected from the group consisting of ester solvents and ether solvents;
and wherein the (thio)phosphoric acid ester amides according to general formula (IIb) are prepared by reacting
at least one O-hydrocarbyloxy(thio)phosphoryl dichloride according to general formula (V)

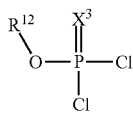

(V)

wherein
X$^3$ and R$^{12}$ are as defined above,
with
1) at least one amine according to general formula HNR$^{16}$R$^{17}$,
wherein
R$^{16}$ and R$^{17}$ are independently of each other selected from the group consisting of H and C$_1$-C$_4$-alkyl,
and/or
2) at least one amide according to general formula MNR$^{16}$R$^{17}$,
wherein
R$^{16}$ and R$^{17}$ are independently of each other selected from the group consisting of H and C$_1$-C$_4$-alkyl, and
M is an alkali metal;
and with
3) at least one alcohol according to general formula HOR$^{15}$,
wherein R$^{15}$ is as defined above
and/or
4) at least one alcoholate according to general formula MOR$^{15}$,
wherein R$^{15}$ is as defined above;
in at least one polar solvent, which is selected from the group consisting of ester solvents and ether solvents, to obtain a product mixture (1.3) comprising as components
(1.3a) at least one (thio)phosphoric acid ester amide according to general formula (IIb),
wherein $X^3$, $R^{12}$, $R^{13}$, $R^{14}$, and $R^{15}$ are as defined above;
(1.3b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl, and
(b2) alkali metal chlorides;
and
(1.3c) at least one polar solvent, which is selected from the group consisting of ester solvents and ether solvents.

As the (thio)phosphoric acid derivative (1a) is preferably a (thio)phosphoric acid triamide according to general formula (I), the process of the invention preferably comprises preparing the (thio)phosphoric acid triamide according to general formula (I) by reacting
at least one N-hydrocarbylamino(thio)phosphoryl dichloride according to general formula
(III)

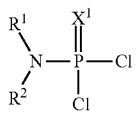

wherein
$X^1$, $R^1$, and $R^2$ are as defined above
with
1) at least one amine according to general formula $HNR^{16}R^{17}$,
wherein
$R^{16}$ and $R^{17}$ are independently of each other selected from the group consisting of H and $C_1$-$C_4$-alkyl,
and/or
2) at least one amide according to general formula $MNR^{16}R^{17}$,
wherein
$R^{16}$ and $R^{17}$ are independently of each other selected from the group consisting of H and $C_1$-$C_4$-alkyl, and
M is an alkali metal;
in at least one polar solvent, which is selected from the group consisting of ester solvents and ether solvents, to obtain a product mixture (1.1) comprising as components
(1.1a) at least one (thio)phosphoric acid triamide according to general formula (I), wherein
$X^1$, $R^1$, $R^2$, $R^3$, $R^4$, $R^5$, and $R^6$ are as defined above;
(1.1 b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl,
and
(b2) alkali metal chlorides;
and
(1.1c) at least one polar solvent, which is selected from the group consisting of ester solvents and ether solvents.

As the (thio)phosphoric acid derivative (1a) is even more preferably NPPT, the process of the invention preferably comprises preparing NPPT by reacting
N-propylaminothiophosphoryl dichloride according to general formula (III)

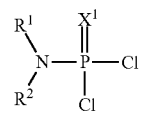

wherein
$X^1$ is S, $R^1$ is n-propyl, and $R^2$ is H
with ammonia and/or sodium amide ($NaNH_2$);
in at least one polar solvent, which is selected from the group consisting of ester solvents and ether solvents, to obtain a product mixture (1.1) comprising as components
(1.1a) NPPT;
(1.1b) at least one salt selected from ammonium chloride and sodium chloride; and
(1.1c) at least one polar solvent, which is selected from the group consisting of ester solvents and ether solvents.

Preferred polar solvents have already been defined above and preferably include tetrahydrofuran, 2-methyltetrahydrofuran, and ethyl acetate.

In one embodiment, the process of preparing the at least one (thio)phosphoric acid derivative (1a), is performed with an amine $HNR^{16}R^{17}$, which is ammonia. This is particularly preferred in connection with the preparation of a (thio)phosphoric acid derivative, which is a (thio)phosphoric acid triamide according to formula (I). In order to prepare a (thio)phosphoric acid triamide according to formula (I), it is preferred that at least 4 equivalents of ammonia are used, so that two equivalents can react with the N-hydrocarbylamino (thio)phosphoryl dichloride and two equivalents can function as HCl scavengers.

Therefore, in a preferred embodiment of the process of preparing the at least one (thio)phosphoric acid derivative (1a), the at least one amine $HNR^{16}R^{17}$ is ammonia ($NH_3$), and from 4 to 20 equivalents, preferably from 4 to 10 equivalents, more preferably from 4 to 7 equivalents of ammonia are provided, when preparing the at least one (thio)phosphoric acid derivative.

In one embodiment, from 4 to 10 equivalents of ammonia are provided.

In one embodiment, from 4 to 7 equivalents of ammonia are provided.

These amounts of ammonia are particularly advantageous as the reaction may be performed at normal pressure and as there is no need for $NH_3$ recycling. Furthermore, decomposition of ester solvents such as ethyl acetate in the presence of $NH_3$, which typically results in the formation of ethanol and acetamide, can be significantly reduced. On the other hand, the problem, which typically accompanies the use of low amounts of ammonia, namely the formation of undesired side-products in the reaction, is not harmful for the process of the present invention. Due to the advantageous isolation process of the invention, it is nevertheless possible to obtain the desired product in a very high purity.

As already indicated above, the dichloride precursors for the preparation of the at least one (thio)phosphoric acid derivative, i.e. the compounds of formulae (III), (IV), or (V) as defined above, are typically provided in combination with an HCl scavenger, preferably an HCl scavenger in protonated form, as a result of the preparation of these precursors. As used herein, the term "HCl scavenger in protonated form" may be understood as the hydrochloride salt of an HCl scavenger. For example, if the HCl scavenger is a tertiary amine $NR_3$, the HCl scavenger is protonated form is the corresponding hydrochloride salt $HNR_3Cl$. The HCl scavenger in deprotonated form is the tertiary amine $NR_3$.

In a preferred embodiment of the process of preparing the at least one (thio)phosphoric acid derivative (1a), the compound according to formula (III), (IV), or (V) is provided in combination with a hydrochloride salt of an HCl scavenger, so that the resulting product mixture (1.1) comprises as component (1.1d) at least one HCl scavenger, the resulting product mixture (1.2) comprises as component (1.2d) at least one HCl scavenger, and the resulting product mixture (1.3) comprises as component (1.3d) at least one HCl scavenger.

In a more preferred embodiment of the process of preparing the at least one (thio)phosphoric acid derivative (1a), wherein said (thio)phosphoric acid derivative (1a) is a (thio)phosphoric acid triamide according to general formula (I), the compound according to formula (III) is provided in combination with a hydrochloride salt of an HCl scavenger, so that the resulting product mixture (1.1) comprises as component (1.1d) at least one HCl scavenger.

In a particularly preferred embodiment of the process of preparing the at least one (thio)phosphoric acid derivative (1a), wherein said (thio)phosphoric acid derivative (1a) is a NPPT, the N-propylaminothiophosphoryl dichloride is provided in combination with a hydrochloride salt of an HCl scavenger, so that the resulting product mixture (1.1) comprises as component (1.1d) at least one HCl scavenger. For example, if the precursor of NPPT is provided in combination with the hydrochloride of tri-n-propylamine $HN(CH_2CH_2CH_3)_3Cl$, the product mixture (1.1) comprises as component (1.1d) $N(CH_2CH_2CH_3)_3$.

Typically, the dichloride precursors for the preparation of the at least one (thio)phosphoric acid derivative, i.e. the compounds of formulae (III), (IV), or (V) as defined above, and the hydrochloride salt of the HCl scavenger are provided in equimolar amounts, as the production of each molecule of the compound of formulae (III), (IV), or (V) also causes the formation of one molecule HCl, which is taken up by one molecule of the HCl scavenger.

Accordingly, in one preferred embodiment of the process of preparing the at least one (thio)phosphoric acid derivative (1a), the compound according to formula (III), (IV) or (V) and the hydrochloride salt of the HCl scavenger are provided in a molar ratio range of 2:1 to 1:2, preferably in a molar ratio range of 1.1:1 to 1:1.1, more preferably in a molar ratio of 1:1, so that the resulting product mixture (1.1) comprises components (1.1a) and (1.1d) in a molar ratio range of 2:1 to 1:2, preferably in a molar ratio range of 1.1:1 to 1:1.1, more preferably in a molar ratio of 1:1, and the resulting product mixture (1.2) comprises components (1.2a) and (1.2d) in a molar ratio range of 2:1 to 1:2, preferably in a molar ratio range of 1.1:1 to 1:1.1, more preferably in a molar ratio of 1:1, and the resulting product mixture (1.3) comprises components (1.3a) and (1.3d) in a molar ratio range of 2:1 to 1:2, preferably in a molar ratio range of 1.1:1 to 1:1.1, more preferably in a molar ratio of 1:1.

In a more preferred embodiment of the process of preparing the at least one (thio)phosphoric acid derivative (1a), wherein said (thio)phosphoric acid derivative (1a) is a (thio)phosphoric acid triamide according to general formula (I), the compound according to formula (III) and the hydrochloride salt of the HCl scavenger are provided in a molar ratio range of 2:1 to 1:2, preferably in a molar ratio range of 1.1:1 to 1:1.1, more preferably in a molar ratio of 1:1, so that the resulting product mixture (1.1) comprises components (1.1a) and (1.1d) in a molar ratio range of 2:1 to 1:2, preferably in a molar ratio range of 1.1:1 to 1:1.1, more preferably in a molar ratio of 1:1.

In a particularly preferred embodiment of the process of preparing the at least one (thio)phosphoric acid derivative (1a), wherein said (thio)phosphoric acid derivative (1a) is a NPPT, the N-propylaminothiophosphoryl dichloride and the hydrochloride salt of the HCl scavenger are provided in a molar ratio range of 2:1 to 1:2, preferably in a molar ratio range of 1.1:1 to 1:1.1, more preferably in a molar ratio of 1:1, so that the resulting product mixture (1.1) comprises components (1.1a) and (1.1d) in a molar ratio range of 2:1 to 1:2, preferably in a molar ratio range of 1.1:1 to 1:1.1, more preferably in a molar ratio of 1:1.

The HCl scavengers have already been defined above.

In a preferred embodiment of the process of preparing the at least one (thio)phosphoric acid derivative (1a), the hydrochloride salt of the HCl scavenger is a hydrochloride salt of a tertiary amine, preferably a hydrochloride salt of triethylamine or a hydrochloride salt of tri-n-propylamine, more preferably a hydrochloride salt of tri-n-propylamine.

If the dichloride precursors for the preparation of the at least one (thio)phosphoric acid derivative (1a) are provided in combination with a hydrochloride salt of the HCl scavenger, a further equivalent of amine $HNR^{16}R^{17}$, which is preferably ammonia, is required for the preparation of the (thio)phosphoric acid derivative (1a), in order to provide the HCl scavenger in deprotonated form.

In one embodiment of the process of preparing the at least one (thio)phosphoric acid derivative (1a), the at least one amine $HNR^{16}R^{17}$ is ammonia ($NH_3$), and from 5 to 20 equivalents, preferably from 5 to 10 equivalents, more preferably 5 to 7 equivalents of ammonia are provided, when preparing the at least one (thio)phosphoric acid derivative.

In one embodiment, from 5 to 10 equivalents of ammonia are provided.

In one embodiment, from 5 to 7 equivalents of ammonia are provided.

The above amounts of ammonia are particularly advantageous as the reaction may be performed at atmospheric pressure (i.e. at 1000±50 mbar) and as there is no need for $NH_3$ recycling. Furthermore, decomposition of ester solvents such as ethyl acetate in the presence of $NH_3$ can be significantly reduced. On the other hand, the problem, which typically accompanies the use of low amounts of ammonia, namely the formation of undesired side-products in the reaction, is not harmful for the process of the present invention. Due to the advantageous isolation process of the invention, it is nevertheless possible to obtain the desired product in a very high purity.

Irrespective of whether the dichloride precursors for the preparation of the at least one (thio)phosphoric acid derivative (1a) are provided in combination with a hydrochloride salt of the HCl scavenger or not, the at least one amine $HNR^{16}R^{17}$ as used in the preparation of the at least one (thio)phosphoric acid derivative (1a) is preferably ammonia, and the following process parameters are preferred for the preparation of the at least one (thio)phosphoric acid derivative.

In one embodiment, the reaction is performed at a temperature and a pressure, which are selected such that the ammonia is present in gaseous form. Accordingly, the use of a high pressure is preferably avoided.

In one embodiment, the reaction is performed at a temperature of more than −30° C., preferably at a temperature in the range of from −20° C. to 30° C., more preferably at a temperature in the range of from 0° C. to 15° C. It has been found that it is not required to perform the reaction at temperature of −30° C. or less because even if the formation of byproducts may increase with increasing temperatures, the isolation process of the present invention nevertheless allows for the isolation of the desired (thio)phosphoric acid derivative (1a) in very high purities.

In any case, it is preferred to avoid water in the reaction mixture, when preparing of the at least one (thio)phosphoric acid derivative (1a).

Therefore, in one embodiment, the reaction is performed in a reaction mixture, which comprises less than 1 wt.-% of water, based on the total weight of the reaction mixture. This avoids the formation of undesired byproducts due to the reaction with water or hydroxide ions, respectively.

As already indicated above, the (thio)phosphoric acid derivative (1a) is preferably NPPT. Therefore, the isolation process of the invention preferably refers to NPPT and particularly preferably also comprises preparing NPPT as described above. In view of the above, the following embodiments are of particular relevance in this connection.

In one embodiment of the process of preparing the (thio)phosphoric acid derivative (1a), which may be performed before the isolation process according to the invention, the (thio)phosphoric acid derivative (1a) is a (thio)phosphoric acid triamide according to general formula (I), which is N-(n-propyl)thiophosphoric acid triamide (NPPT), the N-hydrocarbylamino(thio)phosphoryl dichloride according to general formula (III) is N-(n-propyl)aminothiophosphoryl dichloride, the at least one amine $HNR^{16}R^{17}$ is ammonia ($NH_3$), the at least one polar solvent is tetrahydrofuran, 2-methyltetrahydrofuran, or ethyl acetate, and the at least one salt is ammonium chloride ($NH_4Cl$).

In one embodiment of the process of preparing the (thio)phosphoric acid derivative (1a), which may be performed before the isolation process according to the invention, the (thio)phosphoric acid derivative (1a) is a (thio)phosphoric acid triamide according to general formula (I), which is N-(n-propyl)thiophosphoric acid triamide (NPPT), the N-hydrocarbylamino(thio)phosphoryl dichloride according to general formula (III) is N-(n-propyl)aminothiophosphoryl dichloride, the at least one amine $HNR^{16}R^{17}$ is ammonia ($NH_3$), the at least one polar solvent is tetrahydrofuran, and the at least one salt is ammonium chloride ($NH_4Cl$).

In one embodiment of the process of preparing the (thio)phosphoric acid derivative (1a), which may be performed before the isolation process according to the invention, the (thio)phosphoric acid derivative (1a) is a (thio)phosphoric acid triamide according to general formula (I), which is N-(n-propyl)thiophosphoric acid triamide (NPPT), the N-hydrocarbylamino(thio)phosphoryl dichloride according to general formula (III) is N-(n-propyl)aminothiophosphoryl dichloride, the at least one amine $HNR^{16}R^{17}$ is ammonia ($NH_3$), the at least one polar solvent is 2-methyltetrahydrofuran, and the at least one salt is ammonium chloride ($NH_4Cl$).

In one embodiment of the process of preparing the (thio)phosphoric acid derivative (1a), which may be performed before the isolation process according to the invention, the (thio)phosphoric acid derivative (1a) is a (thio)phosphoric acid triamide according to general formula (I), which is N-(n-propyl)thiophosphoric acid triamide (NPPT), the N-hydrocarbylamino(thio)phosphoryl dichloride according to general formula (III) is N-(n-propyl)aminothiophosphoryl dichloride, the at least one amine $HNR^{16}R^{17}$ is ammonia ($NH_3$), the at least one polar solvent is ethyl acetate, and the at least one salt is ammonium chloride ($NH_4Cl$).

It is preferred in connection with the above embodiments that the N-(n-propyl)amino(thio)phosphoryl dichloride is provided in combination with the hydrochloride of tri-n-propylamine $HN(CH_2CH_2CH_3)_3Cl$, wherein it is preferred that the two components are provided in a molar ratio range of 2:1 to 1:2, preferably in a molar ratio range of 1.1:1 to 1:1.1, more preferably in a molar ratio of 1:1, so that the resulting product mixture (1.1) comprises components (1.1a) and (1.1d) in a molar ratio range of 2:1 to 1:2, preferably in a molar ratio range of 1.1:1 to 1:1.1, more preferably in a molar ratio of 1:1.

It is even more preferred that from 5 to 20, preferably from 5 to 10, more preferably from 5 to 7 equivalents of ammonia are provided.

The above defined process parameters are also especially preferred in combination with these embodiments.

It is to be understood that the process of the present invention, which relates to the isolation of at least one (thio)phosphoric acid derivative (1a), and which may also comprise a process of preparing the at least one (thio) phosphoric acid derivative (1a) from its dichloride precursors (III), (IV), or (V), as outlined above, may also comprise a process of preparing the precursors.

In one embodiment, the process therefore further comprises preparing the compound of formula (III), (IV), or (V) by reacting (thio)phosphorylchloride with an amine $R^1R^2NH$, an alcohol $R^7OH$, or an alcohol $R^{12}OH$, respectively, in the presence of a HCl scavenger, wherein $R^1$, $R^2$ and $R^7$ are as defined above.

The preferences in this connection can be derived from the preferences defined above.

In particular, if the (thio)phosphoric acid derivative (1a) is NPPT, the process further comprises preparing the compound of formula (III), in particular N-(n-propyl)aminothiophosphoryl dichloride by reacting thiophosphorylchloride with an N-(n-propyl)amine in the presence of an HCl scavenger.

The HCl scavengers in this connection have already been defined above.

In one embodiment, the HCl scavenger is a tertiary amine, preferably triethylamine or tri-n-propylamine, more preferably tri-n-propylamine.

In one embodiment, the compound of formula (III), (IV), or (V) is obtained in combination with the hydrochloride salt of an HCl scavenger, wherein the compound according to formula (III) or (IV) and the hydrochloride salt of the HCl scavenger are preferably obtained in a molar ratio range of 2:1 to 1:2, preferably in a molar ratio range of 1.1:1 to 1:1.1, more preferably in a molar ratio of 1:1.

Thus, in connection with NPPT, N-(n-propyl)aminothiophosphoryl dichloride is preferably obtained in combination with the hydrochloride salt of tri-n-propylamine, wherein it is preferred that the two components are obtained in a molar ratio range of 2:1 to 1:2, preferably in a molar ratio range of 1.1:1 to 1:1.1, more preferably in a molar ratio of 1:1.

In summary, the present invention relates to the following embodiments.

1. A process for isolating
    at least one (thio)phosphoric acid derivative (1a), which has a melting point of at least 70° C., and which is selected from
    (i)
    (thio)phosphoric acid triamides according to general formula (I)

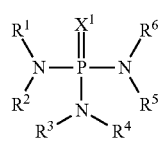

(I)

wherein
X$^1$ is O or S;
R$^1$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;
R$^2$ is H, C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; or R$^1$ and R$^2$ together with the nitrogen atom linking them define a 5- or 6-membered saturated or unsaturated heterocyclic radical, which optionally comprises 1 or 2 further heteroatoms selected from the group consisting of N, O, and S; and R$^3$, R$^4$, R$^5$, and R$^6$ are independently of each other selected from the group consisting of H and C$_1$-C$_4$-alkyl;
and
(ii)
(thio)phosphoric acid ester amides according to any one of general formula (IIa)

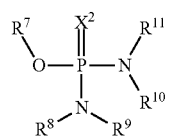

(IIa)

wherein
X$^2$ is O or S;
R$^7$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and
R$^8$, R$^9$, R$^{10}$, and R$^{11}$ are independently of each other selected from the group consisting of H and C$_1$-C$_4$-alkyl;

or general formula (IIb)

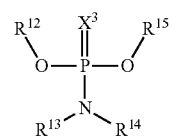

(IIb)

wherein
X$^3$ is O or S;
R$^{12}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;
R$^{15}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and
R$^{13}$ and R$^{14}$ are independently of each other selected from the group consisting of H and C$_1$-C$_4$-alkyl;

from a product mixture (1) comprising as components
    (1a) the at least one (thio)phosphoric acid derivative;
    (1 b) at least one salt selected from the group consisting of
        (b1) ammonium salts according to general formula H$_2$NR$^{16}$R$^{17}$Cl
        wherein
        R$^{16}$ and R$^{17}$ are independently of each other selected from the group consisting of H and C$_1$-C$_4$-alkyl;
        and
        (b2) alkali metal chlorides;
    (1c) at least one polar solvent, which is selected from the group consisting of ester solvents and ether solvents; and (1d) optionally at least one HCl scavenger;
wherein the process comprises at least the steps of
    (a) heating the product mixture (1) to a temperature, which is sufficient for at least partly dissolving the at least one (thio)phosphoric acid derivative (1a);
    (b) separating the solid material from the heated product mixture (1) to remove the at least one salt (1 b) and to obtain a solution comprising the at least one (thio)phosphoric acid derivative (1a), the at least one polar solvent (1c), and optionally the at least one HCl scavenger (1d);
    (c) causing solids formation of the at least one (thio)phosphoric acid derivative (1a) from the obtained solution by partly evaporating the at least one solvent (1c) from the solution and/or cooling the solution; and
    (d) isolating the solid material.

2. The process of embodiment 1, wherein the at least one (thio)phosphoric acid derivative (1a) is selected from
    (i)
    (thio)phosphoric acid triamides according to general formula (I)

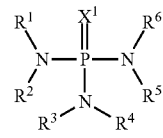

(I)

wherein
X$^1$ is O or S;
R$^1$ is C$_1$-C$_8$-alkyl, C$_5$-C$_6$-cycloalkyl, phenyl, or benzyl;

$R^2$ is H, or $C_1$-$C_4$-alkyl; and
$R^3$, $R^4$, $R^5$, and $R^6$ are each H;
and
(ii)
(thio)phosphoric acid ester amides according to any one of general formula (IIa)

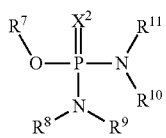
(IIa)

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
or general formula (IIb)

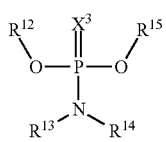
(IIb)

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and
$R^{13}$ and $R^{14}$ are each H.

3. The process of embodiment 1 or 2, wherein the at least one (thio)phosphoric acid derivative (1a) is selected from the group consisting of
N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide; O-ethylphosphoric acid ester diamide, O-phenylthiophosphoric acid ester diamide, O,O-diphenylphosphoric acid diester amide, and O-phenylphosphoric acid ester diamide.

4. The process of any one of embodiments 1 to 3, wherein the at least one (thio)phosphoric acid derivative (1a) has a melting point of at least 75° C., preferably at least 80° C., more preferably at least 85° C.

5. The process of any one of embodiments 1 to 4, wherein the at least one (thio)phosphoric acid derivative (1a) is selected from the group consisting of
N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide; O-ethylphosphoric acid ester diamide, O-phenylthiophosphoric acid ester diamide, O,O-diphenylphosphoric acid diester amide, and O-phenylphosphoric acid ester diamide.

6. The process of any one of embodiments 1 to 5, wherein the at least one (thio)phosphoric acid derivative (1a) is N-(n-propyl)thiophosphoric acid triamide (NPPT).

7. The process of any one of embodiments 1 to 6, wherein the at least one salt (1b) is ammonium chloride ($NH_4Cl$).

8. The process of any one of embodiments 1 to 7, wherein the at least one polar solvent (1c) is selected from cyclic ethers and acyclic carboxylic acid esters, and is preferably selected from tetrahydrofuran, 2-methyltetrahydrofuran, and ethyl acetate.

9. The process of any one of embodiments 1 to 8, wherein the at least one HCl scavenger (1d) is a tertiary amine, preferably triethylamine or tri-n-propylamine, more preferably tri-n-propylamine.

10. The process of any one of embodiments 1 to 9, wherein components (1a), (1b), (1c), and (1d) of product mixture (1) are together present in an amount of at least 75 wt.-%, preferably at least 85 wt.-%, more preferably at least 95 wt.-%, based on the total weight of the product mixture (1).

11. The process of any one of embodiments 1 to 10, wherein component (1a) is present in the product mixture (1) in an amount of from 5 wt.-% to 35 wt.-%, preferably 8 wt.-% to 15 wt.-%, based on the total weight of the product mixture (1).

12. The process of any one of embodiments 1 to 11, wherein, in step (a), the product mixture (1) is heated to a temperature of at least 30° C., preferably to a temperature in the range of from 30° C. to 80° C., more preferably to a temperature in the range of from 40° C. to 60° C.

13. The process of any one of embodiments 1 to 12, wherein, in step (b), the solid material is separated from the heated product mixture (1) obtained in step (b) by filtration.

14. The process of any one of embodiments 1 to 13, wherein, in step (c), no additional solvent is added to the solution obtained in step (b) in order to cause solids formation.

15. The process of any one of embodiments 1 to 14, wherein, in step (c), the solution obtained in step (b) is cooled to a temperature in the range of from −20° C. to 25° C., preferably −10° C. to 15° C., more preferably −5° C. to 5° C.

16. The process of any one of embodiments 1 to 15, wherein, in step (c), at least one tertiary amine is added to the solution obtained in step (b), wherein the at least one tertiary amine is preferably triethylamine or tri-n-propylamine, and corresponds to the HCl scavenger, which is present in the solution obtained in step (b).

17. The process of any one of embodiments 1 to 16, wherein, in step (d), the solid material is isolated by separating the solid material from the mother liquor, and washing and drying it.

18. The process of embodiment 17, wherein the solid material isolated in step (d) comprises the at least one (thio)phosphoric acid derivative in a purity of at least 90 wt.-% based on the total weight of the solid material, preferably in a purity of at least 97 wt.-%.

19. The process of any one of embodiments 1 to 18, wherein the process further comprises preparing the at least one (thio)phosphoric acid derivative (1a), wherein the (thio)phosphoric acid triamides according to general formula (I) are prepared by reacting at least one N-hydrocarbylamino(thio)phosphoryl dichloride according to general formula
(III)

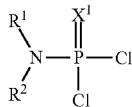

wherein
$X^1$, $R^1$, and $R^2$ are as defined in embodiment 1 or 2
with
1) at least one amine according to general formula $HNR^{16}R^{17}$,
wherein
$R^{16}$ and $R^{17}$ are independently of each other selected from the group consisting of H and $C_1$-$C_4$-alkyl,
and/or
2) at least one amide according to general formula $MNR^{16}R^{17}$, wherein
$R^{16}$ and $R^{17}$ are independently of each other selected from the group consisting of H and $C_1$-$C_4$-alkyl, and
M is an alkali metal;
in at least one polar solvent, which is selected from the group consisting of ester solvents and ether solvents,
to obtain a product mixture (1.1) comprising as components
(1.1a) at least one (thio)phosphoric acid triamide according to general formula (I), wherein
$X^1$, $R^1$, $R^2$, $R^3$, $R^4$, $R^5$, and $R^6$ are as defined in embodiment 1 or 2;
(1.1b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl,
and
(b2) alkali metal chlorides;
and
(1.1c) at least one polar solvent, which is selected from the group consisting of ester solvents and ether solvents;
and wherein the (thio)phosphoric acid ester amides according to general formula (IIa) are prepared by reacting
at least one O-hydrocarbyloxy(thio)phosphoryl dichloride according to general formula (IV)

(IV)

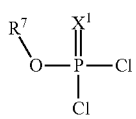

wherein
$X^2$ and $R^7$ are as defined in embodiment 1 or 2,
with
1) at least one amine according to general formula $HNR^{16}R^{17}$,
wherein
$R^{16}$ and $R^{17}$ are independently of each other selected from the group consisting of H and $C_1$-$C_4$-alkyl,
and/or
2) at least one amide according to general formula $MNR^{16}R^{17}$,
wherein
$R^{16}$ and $R^{17}$ are independently of each other selected from the group consisting of H and $C_1$-$C_4$-alkyl, and
M is an alkali metal;
in at least one polar solvent, which is selected from the group consisting of ester solvents and ether solvents,
to obtain a product mixture (1.2) comprising as components
(1.2a) at least one (thio)phosphoric acid ester amide according to general formula (IIa),
wherein $X^2$, $R^7$, $R^8$, $R^9$, $R^{10}$, and $R^{11}$ are as defined in embodiment 1 or 2;
(1.2b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl,
and
(b2) alkali metal chlorides;
and
(1.2c) at least one polar solvent, which is selected from the group consisting of ester solvents and ether solvents;
and wherein the (thio)phosphoric acid ester amides according to general formula (IIb) are prepared by reacting
at least one O-hydrocarbyloxy(thio)phosphoryl dichloride according to general formula (V)

(V)

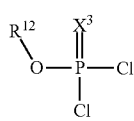

wherein
$X^3$ and $R^{12}$ are as defined in embodiment 1 or 2,
with
1) at least one amine according to general formula $HNR^{16}R^{17}$,
wherein
$R^{16}$ and $R^{17}$ are independently of each other selected from the group consisting of H and $C_1$-$C_4$-alkyl,
and/or
2) at least one amide according to general formula $MNR^{16}R^{17}$,
wherein
$R^{16}$ and $R^{17}$ are independently of each other selected from the group consisting of H and $C_1$-$C_4$-alkyl, and
M is an alkali metal;
and with
3) at least one alcohol according to general formula $HOR^{15}$,
wherein $R^{15}$ is as defined in embodiment 1 or 2
and/or
4) at least one alcoholate according to general formula $MOR^{15}$,
wherein $R^{15}$ is as defined in embodiment 1 or 2;
in at least one polar solvent, which is selected from the group consisting of ester solvents and ether solvents, to obtain a product mixture (1.3) comprising as components
(1.3a) at least one (thio)phosphoric acid ester amide according to general formula (IIb),
wherein $X^3$, $R^{12}$, $R^{13}$, $R^{14}$, and $R^{15}$ are as defined in embodiment 1 or 2;
(1.3b) at least one salt selected from the group consisting of
(b1) ammonium salts according to general formula $H_2NR^{16}R^{17}Cl$
wherein
$R^{16}$ and $R^{17}$ are independently of each other selected from the group consisting of H and $C_1$-$C_4$-alkyl, and
(b2) alkali metal chlorides; and
(1.3c) at least one polar solvent, which is selected from the group consisting of ester solvents and ether solvents.

20. The process of embodiment 19, wherein the at least one amine $HNR^{16}R^{17}$ is ammonia ($NH_3$), and wherein from 4 to 20 equivalents, preferably from 4 to 10 equivalents, more preferably from 4 to 7 equivalents of ammonia are provided, when preparing the at least one (thio)phosphoric acid derivative.

21. The process of embodiment 19, wherein the compound according to formula (III), (IV), or (V) is provided in combination with a hydrochloride salt of an HCl scavenger, so that the resulting product mixture (1.1) comprises as component (1.1d) at least one HCl scavenger, the resulting product mixture (1.2) comprises as component (1.2d) at least one HCl scavenger, and the resulting product mixture (1.3) comprises as component (1.3d) at least one HCl scavenger.

22. The process of embodiment 21, wherein the compound according to formula (III), (IV) or (V) and the hydrochloride salt of the HCl scavenger are provided in a molar ratio range of 2:1 to 1:2, preferably in a molar ratio range of 1.1:1 to 1:1.1, more preferably in a molar ratio of 1:1, so that the resulting product mixture (1.1) comprises components (1.1a) and (1.1d) in a molar ratio range of 2:1 to 1:2, preferably in a molar ratio range of 1.1:1 to 1:1.1, more preferably in a molar ratio of 1:1, and the resulting product mixture (1.2) comprises components (1.2a) and (1.2d) in a molar ratio range of 2:1 to 1:2, preferably in a molar ratio range of 1.1:1 to 1:1.1, more preferably in a molar ratio of 1:1, and the resulting product mixture (1.3) comprises components (1.3a) and (1.3d) in a molar ratio range of 2:1 to 1:2, preferably in a molar ratio range of 1.1:1 to 1:1.1, more preferably in a molar ratio of 1:1.

23. The process of embodiment 21 or 22, wherein the hydrochloride salt of the HCl scavenger is a hydrochloride salt of a tertiary amine, preferably a hydrochloride salt of triethylamine or a hydrochloride salt of tri-n-propylamine, more preferably a hydrochloride salt of tri-n-propylamine.

24. The process of any one of embodiments 21 to 23, wherein the at least one amine $HNR^{16}R^{17}$ is ammonia ($NH_3$), and wherein from 5 to 20 equivalents, preferably from 5 to 10 equivalents, more preferably 5 to 7 equivalents of ammonia are provided, when preparing the at least one (thio)phosphoric acid derivative.

25. The process of any one of embodiments 19 to 24, wherein
the (thio)phosphoric acid derivative (1a) is a (thio)phosphoric acid triamide according to general formula (I), which is N-(n-propyl)thiophosphoric acid triamide (NPPT), the N-hydrocarbylamino(thio)phosphoryl dichloride according to general formula (III) is N-(n-propyl)amino(thio)phosphoryl dichloride,
the at least one amine $HNR^{16}R^{17}$ is ammonia ($NH_3$),
the at least one polar solvent is tetrahydrofuran, 2-methyltetrahydrofuran, or ethyl acetate, and
the at least one salt is ammonium chloride ($NH_4Cl$).

26. The process of any one of embodiments 20, 24 or 25, wherein the reaction is performed at a temperature and a pressure, which are selected such that the ammonia is present in gaseous form.

27. The process of any one of embodiments 20, 24, 26 or 26, wherein the reaction is performed at a temperature of more than −30° C., preferably at a temperature in the range of from −20° C. to 30° C., more preferably at a temperature in the range of from 0° C. to 15° C.

28. The process of any one of embodiments 19 to 27, wherein the reaction is performed in a reaction mixture, which comprises less than 1 wt.-% of water, based on the total weight of the reaction mixture.

29. The process of any one of embodiments 19 to 28, wherein the process further comprises preparing the compound of formula (III), (IV), or (V) by reacting (thio)phosphorylchloride with an amine $R^1R^2NH$, an alcohol $R^7OH$, or an alcohol $R^{12}OH$, respectively, in the presence of a HCl scavenger, wherein $R^1$, $R^2$ and $R^7$ are as defined in embodiment 1 or 2.

30. The process of embodiment 29, wherein the HCl scavenger is a tertiary amine, preferably triethylamine or tri-n-propylamine, more preferably tri-n-propylamine.

31. The process of embodiment 29 or 30, wherein the compound of formula (III), (IV), or (V) is obtained in combination with the hydrochloride salt of an HCl scavenger, wherein the compound according to formula (III) or (IV) and the hydrochloride salt of the HCl scavenger are preferably obtained in a molar ratio range of 2:1 to 1:2, preferably in a molar ratio range of 1.1:1 to 1:1.1, more preferably in a molar ratio of 1:1.

The present invention is further illustrated by the following examples.

EXAMPLES

Characterization:
31P-NMR Analysis was performed as follows:
Apparatus: Bruker DPX 401
Reagents: $D_6$-DMSO (Euriso-top), tetramethylsilane (TMS, reference material no. A 0011/003/NMR3)
Sample preparation: About 130 mg of the test item was weighed in to the nearest 0.01 mg and dissolved into 0.7 ml of $D_6$-DMSO containing a small amount of TMS
Test parameters: Sample concentration: 185.4 g/l; Measuring frequency: 162 MHz; Number of accumulated spectra: 32; Reference: TMS; Temperature: 27° C.
Chemical shift of $PSCl_3$: δ (ppm)=31 (Integral: 0.134)
Chemical shift of NPPT: δ (ppm)=60 (Integral: 100)
HPLC Analysis was performed as follows:
Column: Kromasil 100, C 8, 250×4 mm, 5 μm
Flux: 1 mL/min
Injection volume: 30 μl
Column temperature: 25° C.
Wavelength: 205 nm, BW 8 nm, Ref off
Peak width: >0.005 min (0.12 s)
Run time: 30 min
Eluent A: Water Milli-Q-Purity (R>18 MΩ)
Eluent B: Acetonitrile, HPLC purity

| Gradient: | 0 min: | 25% B |
|---|---|---|
| | 10 min: | 25% B |
| | 11 min: | 100% B |
| | 20 min: | 100% B |
| | 21 min: | 25% B |
| | 30 min: | 25% B |

Example 1

169.4 g (1 mol) PSCl$_3$ and 333.3 g ethyl acetate were precharged at room temperature into a reaction flask and cooled to 0° C. and a mixture of 59.7 g (1.01 mol) n-propylamine and 157.6 g (1.1 mol) tri-n-propylamine was added within 90 min. During the addition the temperature was maintained between 0-2° C. by cooling. The suspension was stirred at 0° C. for additional 60 min and afterwards heated up to dissolve the precipitated salts and obtain a homogeneous dichloride solution.

The prepared dichloride solution was added within 6 hours to a mixture of 102.2 g (6 mol) liquid ammonia and 333.3 g ethyl acetate, which were cooled to 6° C. in advance. The temperature was maintained during the addition between 5-7° C. The suspension was stirred at 5-7° C. for additional 60 min and afterwards the pressure was released.

The resulting raw product was obtained with 90% N-propyl thiophosphoryl triamide (NPPT) yield based on 31P-NMR analysis. The raw product additionally comprised ammonium chloride, ethyl acetate, and tri-n-propylamine.

Example 2

Dichloride solution prepared according to Example 1 was added to a mixture of 238.4 g (14 mol) liquid ammonia and 333.3 g ethyl acetate, which were cooled to 16° C. in advance. The temperature was maintained during the addition between 15-17° C. The suspension was stirred at 15-17° C. for additional 60 min and afterwards the pressure was released.

The resulting raw product was obtained with 93% N-propyl thiophosphoryl triamide (NPPT) yield based on 31P-NMR analysis. The raw product additionally comprised ammonium chloride, ethyl acetate, and tri-n-propylamine.

Example 3

Dichloride solution prepared according to Example 1 was added to 340.6 g (20 mol) liquid ammonia, which was cooled to 6° C. in advance. The temperature was maintained during the addition between 5-7° C. The suspension was stirred at 5-7° C. for additional 60 min and afterwards the pressure was released.

The resulting raw product was obtained with 95% N-propyl thiophosphoryl triamide (NPPT) yield based on 31P-NMR analysis. The raw product additionally comprised ammonium chloride, ethyl acetate, and tri-n-propylamine.

Example 4

169.4 g (1 mol) PSCl$_3$ and 333.3 g methyl-tetrahydrofuran were precharged at room temperature into a reaction flask and cooled to 0° C. and a mixture of 59.7 g (1.01 mol) n-propylamine and 157.6 g (1.1 mol) tri-n-propylamine was added within 90 min. During the addition the temperature was maintained between 0-2° C. by cooling. The suspension was stirred at 0° C. for additional 60 min and afterwards heated up to dissolve the precipitated salts and obtain a homogeneous dichloride solution.

The prepared dichloride solution was added to a mixture of 102.2 g (6 mol) liquid ammonia and 233.3 g methyl-tetrahydrofuran, which were cooled to 6° C. in advance. The temperature was maintained during the addition between 5-7° C. The suspension was stirred at 5-7° C. for additional 60 min and afterwards the pressure was released.

The resulting raw product was obtained with 91% N-propyl thiophosphoryl triamide (NPPT) yield based on 31P-NMR analysis. The raw product additionally comprised ammonium chloride, methyl-tetrahydrofuran, and tri-n-propylamine.

Example 5

Dichloride solution prepared according to Example 4 was added to 340.6 g (20 mol) liquid ammonia, which was cooled to 6° C. in advance. The temperature was maintained during the addition between 5-7° C. The suspension was stirred at 5-7° C. for additional 60 min and afterwards the pressure was released.

The resulting raw product was obtained with 93% N-propyl thiophosphoryl triamide (NPPT) yield based on 31P-NMR analysis. The raw product additionally comprised ammonium chloride, methyl-tetrahydrofuran, and tri-n-propylamine.

Example 6

169.4 g (1 mol) PSCl$_3$ and 333.3 g ethyl acetate were precharged at room temperature into a reaction flask and cooled to 0° C. and a mixture of 59.7 g (1.01 mol) n-propylamine and 157.6 g (1.1 mol) tri-n-propylamine was added within 90 min. During the addition the temperature was maintained between 0-2° C. by cooling. The suspension was stirred at 0° C. for additional 60 min and afterwards heated up to dissolve the precipitated salts and obtain a homogeneous dichloride solution.

The prepared dichloride solution was added parallel with 102.2 g (6 mol) gaseous ammonia (via dip pipe) to 333.3 g ethyl acetate, which was cooled to 6° C. in advance. The temperature was maintained during the addition between 5-7° C.

The resulting raw product was obtained with 88% N-propyl thiophosphoryl triamide (NPPT) yield based on 31P-NMR analysis. The raw product additionally comprised ammonium chloride, ethyl acetate, and tri-n-propylamine.

Example 7

Dichloride solution prepared according to Example 6 was added parallel with 340.6 g (20 mol) gaseous ammonia (via dip pipe) to 333.3 g ethyl acetate, which was cooled to 6° C. in advance.

The temperature was maintained during the addition between 5-7° C.

The resulting raw product was obtained with 91% N-propyl thiophosphoryl triamide (NPPT) yield based on 31P-NMR analysis. The raw product additionally comprised ammonium chloride, ethyl acetate, and tri-n-propylamine.

Example 8

Raw product prepared according to Example 6 was heated up to 50° C. and filtered at this temperature. The filter cake was washed two times with 200 g ethyl acetate at 50° C.

After combining the washing solution and the filtrate approx. 600 g of the light boiler ethyl acetate was distilled off at 74-86° C. and normal pressure. A crystallization at 0° C. was followed by an isolation of the obtained solids by filtration. After drying in a cabinet at 50° C. under vacuum for 24 hours, 90 g N-propyl thiophosphoryl triamide (NPPT) was obtained at 95.9% purity based on HPLC analysis (total yield: 56%).

Example 9

Raw product prepared according to Example 6 was heated up to 50° C. and filtered at this temperature. The filter cake was washed two times with 200 g ethyl acetate at 50° C. After combining the washing solution and the filtrate approx. 680 g of the light boiler ethyl acetate was distilled off at 40-43° C. and reduced pressure. A crystallization at 0° C. was followed by an isolation of the obtained solids by filtration. After drying in a cabinet at 50° C. under vacuum for 24 hours, 111.9 g N-propyl thiophosphoryl triamide (NPPT) was obtained at 98.5% purity based on HPLC analysis (total yield: 73%).

Example 10

Raw product prepared according to Example 6 was heated up to 50° C. and filtered at this temperature. The filter cake was washed two times with 200 g ethyl acetate at 50° C. After combining the washing solution and the filtrate approx. 260 g of the light boiler ethyl acetate was distilled off at 42-43° C. and reduced pressure. A crystallization at 0° C. was followed by an isolation of the obtained solids by filtration. After drying in a cabinet at 50° C. under vacuum for 24 hours, 101.1 g N-propyl thiophosphoryl triamide (NPPT) was obtained at 91.6% purity based on HPLC analysis (total yield: 66%).

The invention claimed is:

1. A process for isolating at least one (thio)phosphoric acid derivative (1a), which has a melting point of at least 70° C., and which is N (n-propyl)thiophosphoric acid triamide (NPPT) from a product mixture (1) comprising
    (1a) the at least one (thio)phosphoric acid derivative (1a);
    (1b) at least one salt selected from the group consisting of
        (b1) ammonium salts according to general formula $H_2NR^{16}R^{17}Cl$
            wherein
            $R^{16}$ and $R^{17}$ are independently of each other selected from the group consisting of H and $C_1$-$C_4$-alkyl; and
        (b2) alkali metal chlorides;
    (1c) at least one polar solvent, which is selected from the group consisting of ester solvents and ether solvents; and
    (1d) optionally at least one HCl scavenger;
wherein the process comprises at least the steps of
    (a) heating the product mixture (1) to a temperature of from 40° C. to 60° C., which is sufficient for at least partly dissolving the at least one (thio)phosphoric acid derivative (1a);
    (b) separating solid material from the heated product mixture (1) to remove the at least one salt (1b) and to obtain a solution comprising the at least one (thio)phosphoric acid derivative (1a) and the at least one polar solvent (1c) and optionally the at least one HCl scavenger (1d);
    (c) causing solids formation by crystallization or precipitation of the at least one (thio)phosphoric acid derivative (1a) from the obtained solution by partly evaporating the at least one solvent (1c) from the solution and/or cooling the solution, wherein no additional solvent with a lower polarity is added to the solution obtained in step (b) in order to cause the solids formation; and
    (d) isolating the solid material by separating the solid material from the mother liquor.

2. The process according to claim 1, wherein the at least one salt (1b) is ammonium chloride ($NH_4Cl$).

3. The process according to claim 1, wherein the at least one polar solvent (1c) is selected from tetrahydrofuran, 2-methyltetrahydrofuran, and ethyl acetate.

4. The process according to claim 1, wherein the at least one HCl scavenger (1d) is a tertiary amine.

5. The process according to claim 1, wherein, in step (a), the product mixture (1) is heated to a temperature of at least 50° C.

6. The process according to claim 1, wherein, in step (c), the solution obtained in step (b) is cooled to a temperature in the range of from −20° C. to 25° C., and/or
    at least one tertiary amine is added to the solution obtained in step (b), wherein the at least one tertiary amine corresponds to the HCl scavenger (1d).

7. The process according to claim 1, wherein the process further comprises preparing the at least one (thio)phosphoric acid derivative (1a), which is N-(n-propyl)thiophosphoric acid triamide (NPPT), in a product mixture (1),
    wherein the N-(n-propyl)thiophosphoric acid triamide (NPPT) is prepared by reacting
        at least one N-hydrocarbylamino(thio)phosphoryl dichloride according to general formula (III)

wherein the N-hydrocarbylamino(thio)phosphoryl dichloride according to the general formula (III) is N-(n-propyl)amino(thio)phosphoryl dichloride
    with
    at least one amine which is ammonia ($NH_3$),
    in at least one polar solvent, which is selected from the group consisting of ester solvents and ether solvents,
    to obtain a product mixture (1.1) comprising
        (1.1a) N-(n-propyl)thiophosphoric acid triamide (NPPT);
        (1.1b) at least one salt which is ammonium chloride; and
        (1.1c) at least one polar solvent, which is selected from the group consisting of ester solvents and ether solvents.

8. The process of claim 7, wherein from 4 to 20 equivalents of ammonia are provided, when preparing the at least one (thio)phosphoric acid derivative (1a).

9. The process of claim 7, wherein the compound according to formula (III) is provided in combination with a hydrochloride salt of an HCl scavenger, so that the resulting product mixture (1.1) comprises as component (1.1d) at least one HCl scavenger.

10. The process of claim 9, wherein from 5 to 20 equivalents of ammonia are provided, when preparing the at least one (thio)phosphoric acid derivative (1a).

11. The process according to claim 7, wherein
the at least one polar solvent is tetrahydrofuran, 2-methyltetrahydrofuran, or ethyl acetate, and
the at least one salt is ammonium chloride ($NH_4Cl$).

12. The process according to claim 8, wherein the reaction for preparing the (thio)phosphoric acid derivative (1a) is performed at a temperature and a pressure, which are selected such that the ammonia is present in gaseous form, and wherein the reaction is performed at a temperature of more than −30° C.

13. The process according to claim 7, wherein the reaction for preparing the (thio)phosphoric acid derivative (1a) is performed in a reaction mixture, which comprises less than 1 wt.-% of water, based on a total weight of the reaction mixture.

* * * * *